US008786630B2

(12) United States Patent
Iwase et al.

(10) Patent No.: US 8,786,630 B2
(45) Date of Patent: Jul. 22, 2014

(54) IMAGE PROCESSING DEVICE, IMAGE PROCESSING METHOD AND PROGRAM

(75) Inventors: Ayako Iwase, Kanagawa (JP); Yuji Saitou, Tokyo (JP); Nobuki Furue, Tokyo (JP); Shinichi Iriya, Kanagawa (JP); Hiroyuki Ozawa, Tokyo (JP)

(73) Assignee: Sony Corporation, Tokyo (JP)

( * ) Notice: Subject to any disclaimer, the term of this patent is extended or adjusted under 35 U.S.C. 154(b) by 288 days.

(21) Appl. No.: 12/793,219

(22) Filed: Jun. 3, 2010

(65) Prior Publication Data

US 2010/0321406 A1    Dec. 23, 2010

(30) Foreign Application Priority Data

Jun. 23, 2009    (JP) .................................. 2009-148779

(51) Int. Cl.
  *G09G 5/00*    (2006.01)
  *G06F 3/041*    (2006.01)
  *H04N 9/76*    (2006.01)

(52) U.S. Cl.
  USPC ............ 345/629; 345/638; 345/173; 348/598

(58) Field of Classification Search
  USPC ......................... 345/629, 638, 173; 348/598
  See application file for complete search history.

(56) References Cited

U.S. PATENT DOCUMENTS

| 7,046,285 | B2 * | 5/2006 | Miyagi et al. ............ 348/333.05 |
| 8,155,698 | B2 * | 4/2012 | Roberts et al. ............ 455/556.1 |
| 2003/0063133 | A1 | 4/2003 | Foote et al. | |
| 2007/0035639 | A1 | 2/2007 | Aridone et al. | |
| 2007/0118281 | A1 * | 5/2007 | Adam et al. .................. 701/211 |
| 2008/0159718 | A1 | 7/2008 | Kuroiwa et al. | |
| 2009/0115862 | A1 | 5/2009 | Andersson | |

(Continued)

FOREIGN PATENT DOCUMENTS

| EP | 1 631 083 A1 | 3/2006 |
| JP | 2000-261744 | 9/2000 |

(Continued)

OTHER PUBLICATIONS

Pongnumkul et al., Creating Map-based Storyboards for Browsing Tour Videos, UIST'08 Proceedings of the 21st annual ACM symposium on User interface software and technology, pp. 13-22, ACM 2008.*

(Continued)

*Primary Examiner* — Kee M Tung
*Assistant Examiner* — Haixia Du
(74) *Attorney, Agent, or Firm* — Oblon, Spivak, McClelland, Maier & Neustadt, L.L.P.

(57) ABSTRACT

There is provided an image processing device including a map screen generation portion that, based on image pickup position information indicating a plurality of image pickup positions of moving images picked up, generates a map screen including a map on which a trajectory line indicating a movement trajectory of the image pickup position is drawn, a display control portion that causes a display portion to display the map screen, and a position detecting portion that detects a position on a display screen of the display portion which a user specifies using an operating body, wherein the position detecting portion detects a point on the trajectory line specified by the operating body, and, based on the image pickup position information, the display control portion causes a thumbnail image of the moving image picked up at an image pickup position corresponding to the detected point to be displayed on the map screen.

13 Claims, 13 Drawing Sheets

(56) References Cited

U.S. PATENT DOCUMENTS

| | | | |
|---|---|---|---|
| 2009/0216767 A1* | 8/2009 | Kotro et al. | 707/7 |
| 2010/0184451 A1* | 7/2010 | Wang et al. | 455/456.1 |
| 2010/0191459 A1* | 7/2010 | Carter et al. | 701/208 |

FOREIGN PATENT DOCUMENTS

| | | |
|---|---|---|
| JP | 2001-290820 | 10/2001 |
| JP | 2006-33273 | 2/2006 |
| JP | 2006-254414 | 9/2006 |
| JP | 2007-132680 | 5/2007 |
| JP | 2007-134771 | 5/2007 |
| JP | 2008-11044 | 1/2008 |
| JP | 2008-128713 | 6/2008 |
| JP | 2008-166988 | 7/2008 |
| JP | 2009-95047 | 4/2009 |
| WO | WO 2009/059810 A1 | 5/2009 |

OTHER PUBLICATIONS

Chen et al., Integrated videos and maps for driving directions, UIST '09 Proceedings of the 22nd annual ACM symposium on User interface software and technology, pp. 223-232, ACM 2009.*

Moynihan, New Sony Camcorders Do GPS, Too, PCWorld, Jan. 7, 2009, retrieved from internet on Aug. 15, 2012.*

European Search Report issued Feb. 24, 2011, in European Patent Application No. 10166032.2.

Partial European Search Report issued Oct. 8, 2010 in Patent Application No. 10166032.2.

Office Action issued Apr. 23, 2013 in Japanese Patent Application No. 2009-148779.

Office Action mailed Jan. 14, 2014, in Japanese Patent Application No. 2009-148779.

* cited by examiner

FIG. 5

| IMAGE PICKUP POSITION | IMAGE PICKUP TIME |
|---|---|
| X1, Y1 | 2009-05-05-10:30:40 |
| X2, Y2 | 2009-05-05-10:31:40 |
| X3, Y3 | 2009-05-05-10:32:40 |
| ⋮ | ⋮ |

IMAGE PROCESSING DEVICE, IMAGE PROCESSING METHOD AND PROGRAM

BACKGROUND OF THE INVENTION

1. Field of the Invention

The present invention relates to an image processing device, an image processing method and a program.

2. Description of the Related Art

Normal playback display and film roll display are known as an image display method for displaying moving images picked up and recorded by an imaging device such as a video camera. The normal playback display is a display method in which the recorded moving images are played back and displayed along a time axis from the beginning. A user can ascertain content of the picked up moving images by looking at the video that is normally played back and displayed. However, it takes time until the user can ascertain the content of the picked up moving images. In order to reduce the time, there is a method in which moving images are played back at a fast speed and displayed. However, even when the moving images are played back at a fast speed, a certain time is still required to ascertain the content of the whole picked up moving images.

On the other hand, the film roll display is a display method in which a plurality of frame images are selected at a predetermined time interval from the recorded moving images, and the frame images are arranged as thumbnail images in chronological order and displayed (as disclosed, for example, in Japanese Patent Application Publication No. JP-A-2007-134771 and Japanese Patent Application Publication No. JP-A-2008-166988). With the film roll display, when a thumbnail image is selected from the at-a-glance display of the thumbnail images, the moving images can also be normally played back and displayed from a playback position corresponding to the selected thumbnail image. With the film roll display, the whole content of the picked up moving images can be presented to the user in a more understandable manner as compared to the above-described normal playback display.

SUMMARY OF THE INVENTION

However, with the above-described film roll display, the plurality of thumbnail images are just arranged in chronological order. Therefore, it is not possible to ascertain an image pickup situation, such as pickup positions when the moving images are picked up.

Further, when the moving images are edited using the film roll display, normally, the moving images are operated and edited on the time axis such that, for example, the thumbnail images arranged in chronological order are deleted. Therefore, the user edits the moving images relying only on his/her temporal memory associated with the time at which the user captured the moving images. The user therefore cannot edit the moving images intuitively, also using his/her spatial memory associated with the time at which the user captured the moving images.

In light of the foregoing, it is desirable to present the user with image pickup positions when moving images are picked up and content of the moving images picked up at the respective image pickup positions such that the image pickup positions and the content are associated with each other.

According to an embodiment of the present invention, there is provided an image processing device including a map screen generation portion that, based on image pickup position information indicating a plurality of image pickup positions of moving images picked up by a moving imaging device, generates a map screen including a map on which a trajectory line indicating a movement trajectory of the image pickup position is drawn, a display control portion that causes a display portion to display the map screen, and a position detecting portion that detects a position on a display screen of the display portion which a user specifies using an operating body, wherein the position detecting portion detects a point on the trajectory line specified by the operating body, and wherein, based on the image pickup position information, the display control portion causes a thumbnail image of the moving image picked up at an image pickup position corresponding to the detected point to be displayed on the map screen.

When the trajectory line displayed on the display screen is traced by the operating body, the position detecting portion sequentially may detect a plurality of points on the trajectory line traced by the operating body, and, based on the image pickup position information, the display control portion may cause a plurality of thumbnail images picked up at a plurality of image pickup positions that respectively correspond to the detected plurality of points to be sequentially displayed on the map screen.

The display control portion may change, in accordance with a scale of the map, an interval between the points at which the thumbnail images are displayed when the trajectory line is traced.

When the position detecting portion detects a predetermined operation performed on the map screen by the operating body, the display control portion may change the scale of the map in accordance with the predetermined operation.

The map screen may further include at least one function icon representing a predetermined function that can be performed on the moving image. The image processing device further may include a function control portion that performs the predetermined function on the moving image. The position detecting portion may detect a section of the trajectory line specified by a predetermined operation performed on the map screen by the operating body, and the function icon specified by the operating body. Based on the image pickup position information, the function control portion may perform the predetermined function corresponding to the specified function icon, on a section of the moving images corresponding to the specified section of the trajectory line.

The predetermined function may include at least one of a function that deletes at least some section of the moving images, a function that attributes an evaluation value to at least some section of the moving images, a function that plays back at least some section of the moving images, and a function that creates a playlist using at least some section of the moving images.

The position detecting portion may detect a position in which the operating body touches or approaches the display screen of the display portion.

According to another embodiment of the present invention, there is provided an image processing method including the steps of generating, based on image pickup position information indicating a plurality of image pickup positions of moving images picked up by a moving imaging device, a map screen including a map on which a trajectory line indicating a movement trajectory of the image pickup position is drawn, displaying the map screen on a display portion, detecting a point on the trajectory line specified by an operating body, the detecting being performed by a position detecting portion that detects a position on a display screen of the display portion which a user specifies using the operating body, and displaying on the map screen a thumbnail image of the moving image picked up at an image pickup position corresponding to the detected point, based on the image pickup position information.

According to another embodiment of the present invention, there is provided a program including instructions that command a computer to perform the steps of generating, based on image pickup position information indicating a plurality of image pickup positions of moving images picked up by a moving imaging device, a map screen including a map on which a trajectory line indicating a movement trajectory of the image pickup position is drawn, displaying the map screen on a display portion, detecting a point on the trajectory line specified by an operating body, the detecting being performed by a position detecting portion that detects a position on a display screen of the display portion which a user specifies using the operating body, and displaying on the map screen a thumbnail image of the moving image picked up at an image pickup position corresponding to the detected point, based on the image pickup position information.

According to another embodiment of the present invention, there is provided a storage medium that store a program including instructions that command a computer to perform the steps of generating, based on image pickup position information indicating a plurality of image pickup positions of moving images picked up by a moving imaging device, a map screen including a map on which a trajectory line indicating a movement trajectory of the image pickup position is drawn, displaying the map screen on a display portion, detecting a point on the trajectory line specified by an operating body, the detecting being performed by a position detecting portion that detects a position in which the operating body touches or approaches a display screen of the display portion, and displaying on the map screen a thumbnail image of the moving image picked up at an image pickup position corresponding to the detected point, based on the image pickup position information.

With the above-described structure, based on the image pickup position information, the map screen is generated that includes the map on which the trajectory line indicating the movement trajectory of the image pickup position is drawn, and the map screen is displayed on the display portion. The point on the trajectory line specified by the operating body is detected by the position detecting portion, and, based on the image pickup position information, the thumbnail image of the moving image picked up at the image pickup position corresponding to the detected point is displayed on the map screen. Thus, when the user specifies a given point on the trajectory line on the map screen using the operating body, the thumbnail image picked up at the image pickup position corresponding to the point is displayed.

According to the embodiments of the present invention described above, it is possible to present the user with pickup positions when moving images are picked up and content of the moving images picked up at the respective pickup positions such that the image pickup positions and the content are associated with each other.

BRIEF DESCRIPTION OF THE DRAWINGS

FIG. 5 is a diagram showing a specific example of an image pickup position table according to the embodiment;

DETAILED DESCRIPTION OF THE EMBODIMENT(S)

Figure 1:
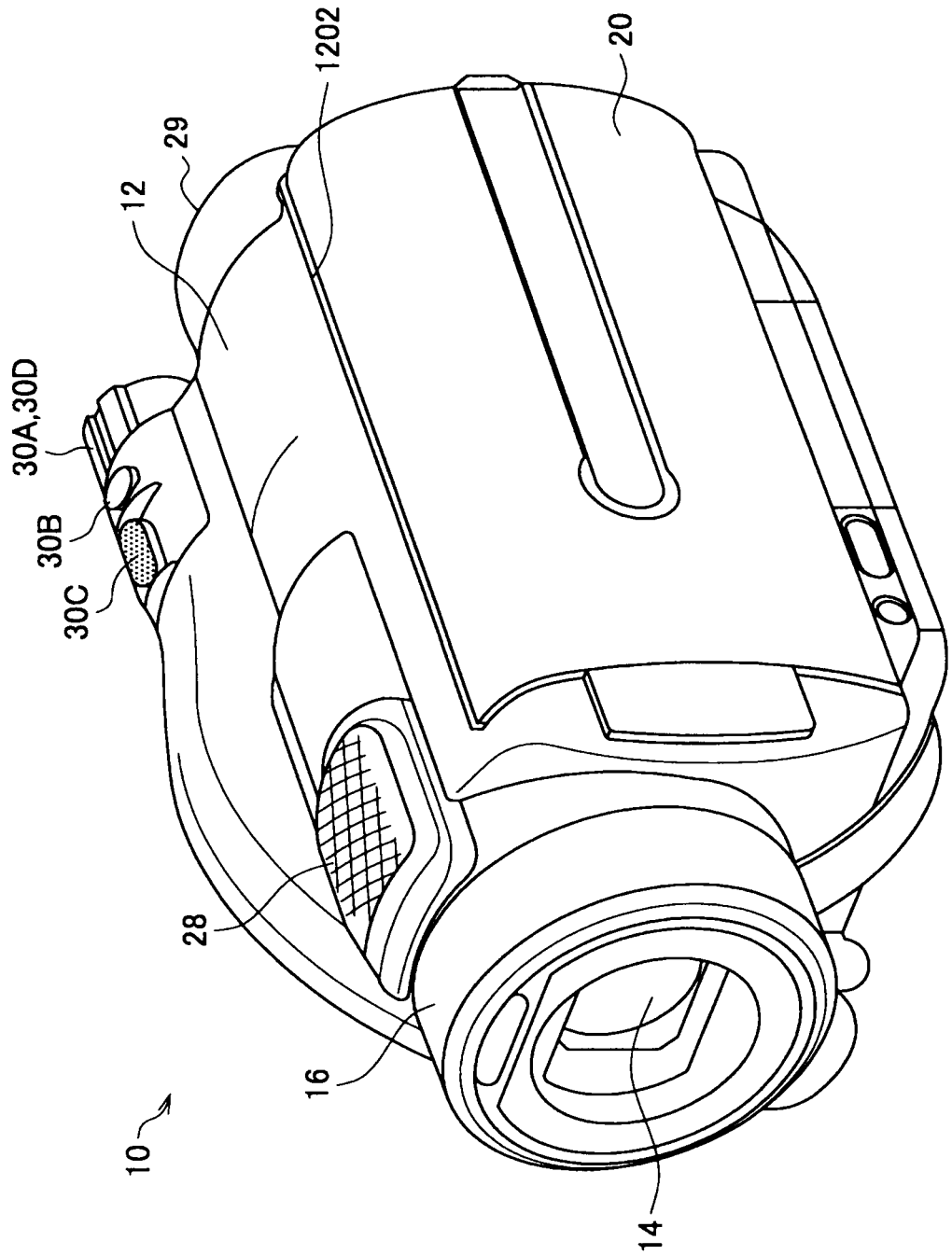
FIG. 1 is a perspective view showing an external structure of a front surface side of an imaging device according to an embodiment of the present invention.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

Figure 2:
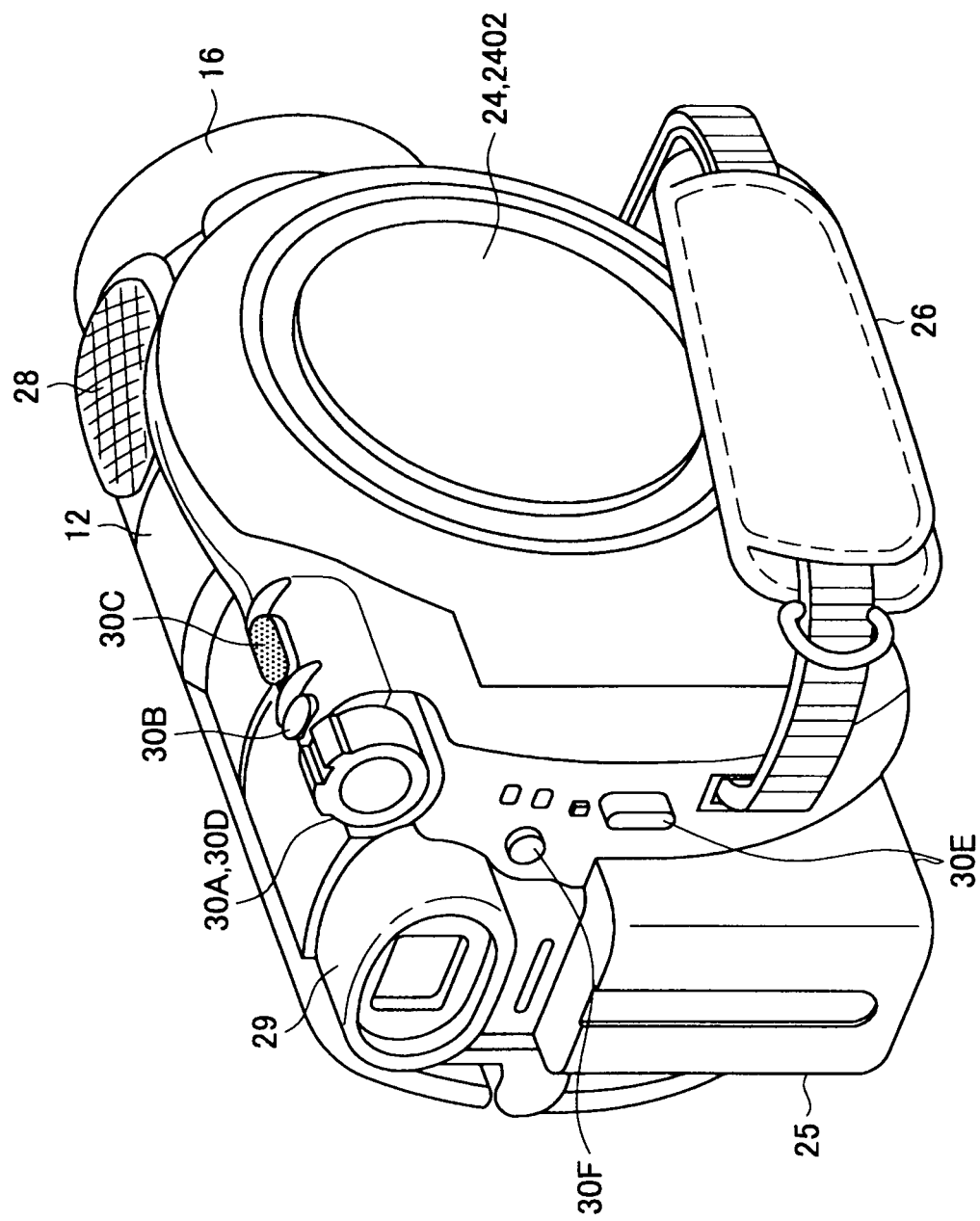
FIG. 2 is a perspective view showing an external structure of a rear surface side of the imaging device according to the embodiment.
Figure 3:
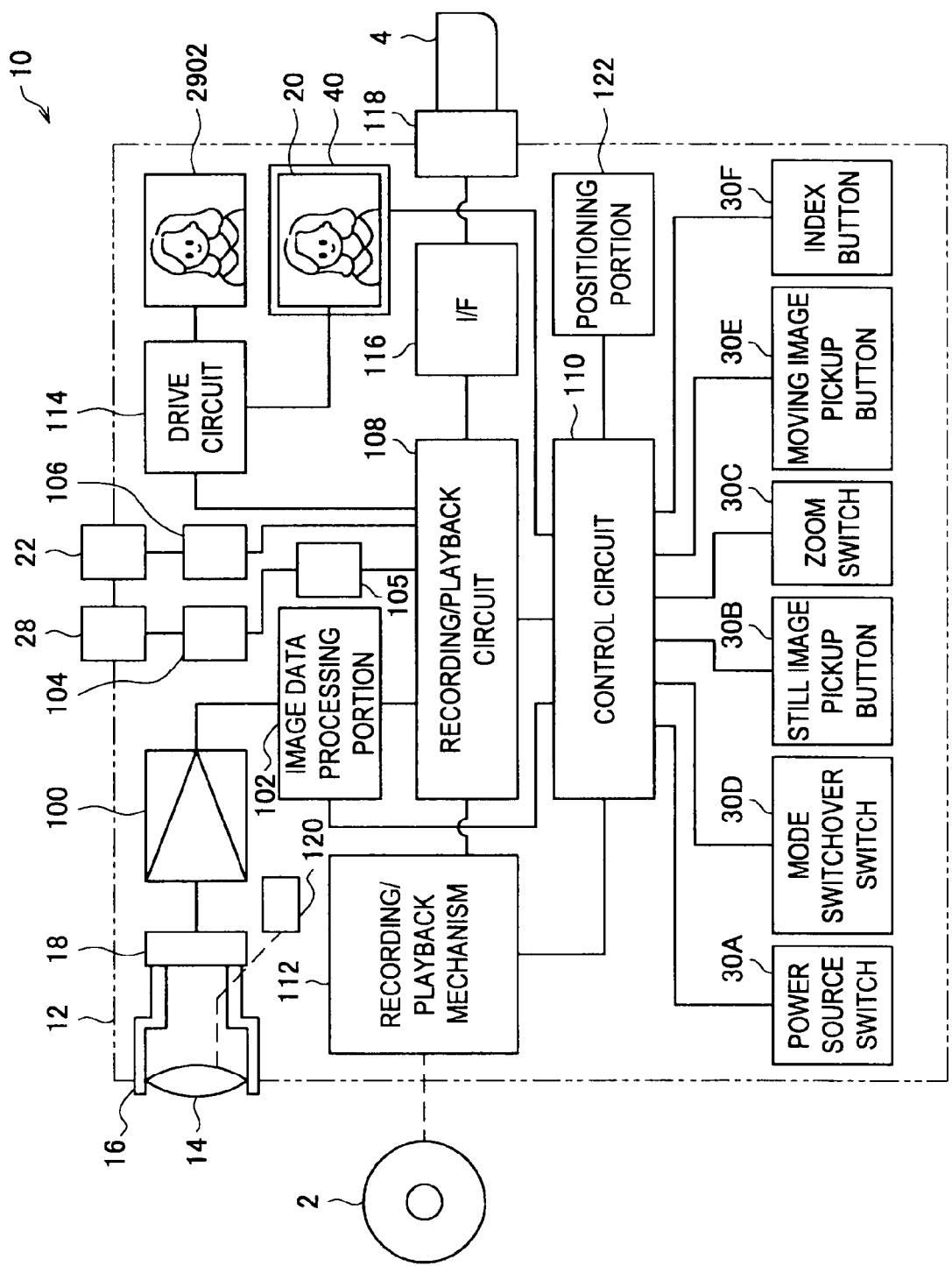
FIG. 3 is a block diagram showing a hardware configuration of the imaging device according to the embodiment.

An explanation will be given in the following order.
1. Structure of imaging device
2. Functional structure of imaging device
3. Display example of map screen
4. Display example of thumbnail images on map screen
5. Display example of thumbnail images when trajectory line is traced
6. Scaled up/scaled down display of map screen
7. Editing of moving images using map screen
8. Display process flow of map screen
9. Editing process flow on map screen
10. Conclusion
1. Structure Of Imaging Device First, a structure of an imaging device according to a first embodiment of the present invention, as one of examples of an image processing device, will be explained with reference to FIG. 1 to FIG. 3. FIG. 1 and FIG. 2 are perspective views showing an external structure of a front surface side and a rear surface side of an imaging device 10 according to the first embodiment. FIG. 3 is a block diagram showing a hardware configuration of the imaging device 10 according to the first embodiment.

As shown in FIG. 1 and FIG. 2, the image processing device according to the present embodiment is, for example, the imaging device 10 such as a digital video camera, and has functions to capture and record the moving images, and to play back and display the recorded the moving images. However, the image processing device according to the present invention is not limited to the example of the imaging device and can also be applied to any chosen electronic device, as long as it has an screen position detecting device such as a touch panel. It can be, for example, a digital still camera, a mobile telephone, a personal digital assistant (PDA), a mobile video/music player, a mobile terminal, a game console, a personal computer, an image playback device, an image editing device or the like.

A case 12 that forms an exterior of the imaging device 10 has dimensions in which a length in the front-to-rear direction and a height in the vertical direction are longer than a width in the left-to-right direction. Note that, in the present specification, the left and right are defined in a state in which the imaging device 10 is seen from the rear, and also, a photographic subject side in a direction of an optical axis of an image pickup optical system is referred to as the front, and a side of an image pickup element is referred to as the rear.

A lens barrel 16 with a built-in image pickup optical system 14 is provided on a front section of an upper portion of the case 12. The lens barrel 16 extends in the front-to-rear direction such that a front portion of the lens barrel 16 faces a front surface of the case 12. An image pickup element 18 (refer to FIG. 3), which picks up an image of a photographic subject introduced by the image pickup optical system 14, is provided on a rear end of the lens barrel 16.

As shown in FIG. 1, a display panel 20 is provided openably-closeably on a left side portion of the case 12, and when the display panel 20 is closed, it is housed in a storage recess 1202. The display panel 20 is an example of a display portion to display images etc. picked up by the image pickup element 18, and is formed, for example, of a liquid crystal display (LCD) or an organic electro-luminescence (EL) display. Note that a speaker 22 (refer to FIG. 3), which outputs played back audio data, is provided on a bottom wall of the storage recess 1202.

As shown in FIG. 2, a grip belt 26 that extends in the front-to-rear direction is provided on a right side surface of the case 12. Further, a storage portion 24 is provided on a right side portion of the case 12, the storage portion 24 detachably storing a disk-shaped recording medium 2 (refer to FIG. 3) that records image data and audio data. The storage portion 24 is opened and closed using an open/close cover 2402. The disk-shaped recording medium 2 is an optical disk, such as, for example, a Blu-ray disc, a digital versatile disc (DVD) or a compact disc (CD) etc. Note that the recording medium to record picked up images may be a recording medium other than the above-described optical disk, and may be, for example, a chosen removable medium known as a semiconductor memory, such as magneto-optical disk or a memory card 4 (refer to FIG. 3). Alternatively, the recording medium may be a built-in recording medium, such as a hard disk built into the imaging device 10.

Furthermore, a microphone 28 that collects sound is provided on a front portion of an upper surface of the case 12. An electronic viewfinder device 29 with a built-in compact display device 2902 (refer to FIG. 3) is provided on a rear portion of the upper surface of the case 12. In addition, a battery 25 is detachably mounted on a lower portion of a rear surface of the case 12.

In addition, as shown in FIG. 1 and FIG. 2, as operating portions to instruct execution of various functions relating to image pickup, the imaging device 10 is provided with, for example, a power source switch 30A, a still image pickup button 30B, a zoom switch 30C, a mode switchover switch 30D, a moving image pickup button 30E and an index button 30F etc. The moving image pickup button 30E is an operating tool for a user to instruct the imaging device 10 to start or end recording of picked up moving images, and is used both as a recording start button and a recording stop button. When the user decides a composition of a photographic subject he/she wishes to capture and depresses the moving image pickup button 30E, the imaging device 10 starts a recording operation, and when the user once more depresses the moving image pickup button 30E, the imaging device 10 stops the recording operation. Note that the recording operation is an operation in which data of images (moving images formed by a plurality of frames) that are continuously picked up by the above-described image pickup element 18 are recorded onto the recording medium.

Next, an internal structure of the imaging device 10 will be explained in detail with reference to FIG. 3. As shown in FIG. 3, the imaging device 10 is provided with the above-described case 12, the image pickup optical system 14, the lens barrel 16, the image pickup element 18, the display panel 20, the speaker 22, the microphone 28 and the variety of operating portions 30A to 30F. Additionally, the imaging device 10 is provided with a touch panel 40, a video signal amplifier circuit 100, an image data processing portion 102, a microphone amplifier circuit 104, an audio data processing circuit 105, an output amplifier circuit 106, a recording/playback circuit 108, a control circuit 110, a recording/playback mechanism 112, a drive circuit 114, an interface circuit 116, a memory card slot 118, a zoom drive portion 120 and a positioning portion 122.

The image pickup optical system 14, the lens barrel 16, the image pickup element 18 and the zoom drive portion 120 etc. all function as an image pickup portion 200 (refer to FIG. 4) that picks up an image of a photographic subject and outputs an image pickup signal. The image pickup optical system 14 is formed of a variety of lenses, such as a focus lens and a zoom lens, and of optical components, such as an optical filter that eliminates unnecessary wavelengths, an aperture and so on. Light that is incident from the photographic subject is introduced into the image pickup element 18 via each of the optical components of the image pickup optical system 14. The image pickup element 18 is, for example, a solid-state imaging element, such as a charge coupled device (CCD) or a complementary metal oxide semiconductor (CMOS). The image pickup element 18 performs photoelectric conversion on the light introduced via the image pickup optical system 14, and outputs an image pickup signal (analog video signal) that represents the picked up image of the photographic subject.

The video signal amplifier circuit 100 and the image data processing portion 102 function as an image processing portion 210 (refer to FIG. 4) that performs signal processing on the image pickup signal generated by the image pickup portion 200 and generates image data. The image pickup signal generated by the above-described image pickup element 18 is amplified by the video signal amplifier circuit 100 and supplied to the image data processing portion 102. The image data processing portion 102 performs predetermined signal processing on the image pickup signal to generate image data (moving image data or still image data), and then supplies the generated image data to the recording/playback circuit 108. The predetermined signal processing is, for example, analog signal processing, such as correlated double sampling (CDS) processing or gain processing using a programmable gain amplifier (PGA), or is digital signal processing, such as A/D conversion processing, gamma correction processing, white balance processing or the like.

Further, an audio signal collected by the microphone 28 is amplified by the microphone amplifier circuit 104, and is supplied to the recording/playback circuit 108 as audio data on which the audio data processing circuit 105 has performed predetermined signal processing.

The recording/playback circuit 108 and the recording/playback mechanism 112 function as a recording/playback portion 220 (refer to FIG. 4) that records various data, such as image data and audio data, onto the recording medium, and also plays back the various data recorded on the recording medium. The recording/playback circuit 108 controls the recording/playback mechanism 112 based on instructions from the control circuit 110, and thus records and plays back data on the disk-shaped recording medium 2.

For example, in accordance with control of the control circuit 110, the recording/playback circuit 108 supplies to the recording/playback mechanism 112 the image data (moving image data or still image data) supplied from the image data processing portion 102 and the audio data supplied from the audio data processing portion 105. The recording/playback mechanism 112 records the moving image data, the still image data and the audio data onto the disk-shaped recording medium 2.

Further, via the interface circuit 116, the recording/playback circuit 108 records the moving image data or still image data supplied from the image data processing portion 102 and the audio data supplied from the audio data processing portion 105 onto the memory card 4 installed in the memory card slot 118.

In addition, in accordance with control of the control circuit 110 and via the drive circuit 114, the recording/playback circuit 108 supplies the moving image data or still image data supplied from the image data processing portion 102 to the display panel 20 and the display device 2902 and causes the image to be displayed.

Additionally, along with supplying moving image data or still image data supplied from the memory card 4 via the interface circuit 116 to the display panel 20 and the display device 2902 via the drive circuit 114 and causing the image to be displayed, the recording/playback circuit 108 also supplies audio data supplied from the memory card 4 via the interface circuit 116 to the speaker 22 via the output amplifier circuit 106 and causes the audio to be output.

Furthermore, along with supplying moving image data or still image data played back by the recording/playback mechanism 112 from the disk-shaped recording medium 2 to the display panel 20 and the display device 2902 via the drive circuit 114 and causing the image to be displayed, the recording/playback circuit 108 also supplies audio data played back by the recording/playback mechanism 112 from the disk-shaped recording medium 2 to the speaker 22 via the output amplifier circuit 106 and causes the audio to be output.

The display panel 20 and the display device 2902 function as display portions that display the various image data (moving image data, still image data) supplied in the manners described above. For example, the display panel 20 and the display device 2902 display the moving images (live view images) that are input in real time from the recording/playback circuit 108 during image pickup. In this way, while watching moving images being picked up by the imaging device 10, the user can perform image pickup operations (a zooming operation, an instruction to start recording, an instruction to end recording, an operation to input index instructions etc.) and can thus pick up an image of a selected photographic subject with a selected composition. Furthermore, when the moving images recorded on the recording media 2 and 4 are played back by the recording/playback circuit 108, the display panel 20 and the display device 2902 displays the playback images input from the recording/playback circuit 108. In this way, the user can verify the content of the moving images recorded on the recording media 2 and 4.

The touch panel 40 functions as a position detecting portion that detects a position in which an operating body touches or approaches a display screen of the display panel 20. The touch panel 40 is overlaid with the display panel 20, and is equipped with a sensor that detects a position on the display screen when the operating body touches or approaches the display screen. In this way, the touch panel 40 can detect the position on the display screen that is specified by the operating body, and can detect a movement trajectory and a movement speed of the operating body. The operating body used to operate the touch panel 40 is, for example, a finger of the user, a stylus or a touch pen, etc. The touch panel 40 detects the position at which the operating body touches or approaches the display screen as coordinates, and the coordinates detected by the touch panel 40 are transmitted to the control circuit 110 and predetermined processing is performed.

For example, a chosen type of touch panel can be adopted as the touch panel 40, such as a pressure-sensitive touch panel, an electrostatic touch panel, an optical touch panel or the like. The pressure-sensitive touch panel detects changes in pressure when the panel is pressed by the operating body. The electrostatic touch panel detects electrical signals from static electricity caused by the operating body touching the panel. In a general type of optical touch panel, an optical sensor provided in the outer framework of the display panel detects the position and movement direction of the operating body that touches the panel. Further, as another type of optical sensor, there is an in-cell optical touch panel. In the in-cell optical touch panel, an optical sensor array is mounted in the display panel and the optical sensor array detects the position and movement trajectory of the operating body that touches or approaches the display panel.

A contact-type touch panel that detects the touch of the operating body (for example, the above-described pressure-sensitive touch panel and electrostatic touch panel) is generally used as the touch panel 40. The user presses on the surface of (namely taps) the touch panel 40 with his/her finger or a stylus etc., and can perform various operations on the imaging device 10 by moving the finger or stylus that is pressing the touch panel 40.

Note that non-contact touch panels are also available that detect the approach of the operating body even if the operating body does not touch the touch panel. The non-contact touch panel is, for example, the above-described optical touch panel. Hereinafter, for ease of explanation, examples are explained in which the contact-type touch panel 40 detects the position touched by the operating body (a finger, for example), but the position detecting portion of the present invention is not limited to this example, and can be a non-contact touch panel or another type of screen position detecting device.

The control circuit 110 functions as a control portion 230 (refer to FIG. 4) that controls each portion of the imaging device 10. The control circuit 110 is, for example, a central processing unit (CPU), an electrically erasable programmable read-only memory (EEPROM), a read-only memory (ROM), a random access memory (RAM) or the like. The ROM of the control circuit 110 stores a program to execute various control processes of the control circuit 110. The CPU operates based on the program, and, using the RAM, performs numerical calculations and control processing to perform each of the above-described control processes. The program can be stored in advance in a storage device (for example, the ROM) built into the imaging device 10. Alternatively, the program may be stored in a removable recording medium and supplied to the imaging device 10, or may be downloaded to the imaging device 10 via a network such as a LAN, the Internet and so on.

Examples of controls of the control circuit 110 will be described. The control circuit 110 switches a power source of the imaging device 10 on and off, based on operation of the power source switch 30A by the user.

In addition, by transmitting an instruction to the image data processing portion 102 and the recording/playback circuit 108 based on user operation of the still image pickup button 30B, the control circuit 110 causes still image data to be recorded on the disk-shaped recording medium 2 by supplying the still image data supplied from the image data processing portion 102 to the recording/playback mechanism 112 via the recording/playback circuit 108. In this way, the still image pickup button 30B functions as a so-called shutter button to pickup and record still images.

Further, by transmitting an instruction to the zoom drive portion 120 based on operation of the zoom switch 30C by the user, the control circuit 110 causes a movable lens (not shown in the figures) of the image pickup optical system 14 to move, and thus changes a zoom ratio of the image pickup optical system 14.

Additionally, by transmitting an instruction to the image data processing portion 102 based on operation of the mode switchover switch 30D, the control circuit 110 switches between a moving image pickup mode in which the image data processing portion 102 generates moving image data and a still image pickup mode in which the image data processing portion 102 generates still image data. Note that, in the moving image pickup mode, the moving image data generated by the image data processing portion 102 is recorded onto the disk-shaped recording medium 2 or the memory card 4 via the recording/playback circuit 108, and in the still image pickup mode, the still image data generated by the image data processing portion 102 is recorded onto the disk-shaped recording medium 2 or the memory card 4 via the recording/playback circuit 108. Note also that, in addition to the above-described two pickup modes, the control circuit 110 can switch to a playback mode to playback the recorded images.

Additionally, based on a first operation by the user of the moving image pickup button 30E, the control circuit 110 starts and stops recording of the moving image data by the imaging device 10. In other words, by transmitting an instruction to the image data processing portion 102 and the recording/playback circuit 108 based on the user operation of the moving image pickup button 30E (recording start instruction), the control circuit 110 causes an operation to start (image recording start) in which moving image data is recorded onto the disk-shaped recording medium 2 by supplying the moving image data supplied from the image data processing portion 102 to the recording/playback mechanism 112 via the recording/playback circuit 108. In addition, based on a second operation by the user of the moving image pickup button 30E (recording stop instruction), the control circuit 110 stops the above-described recording operation (image recording end). In this way, the moving image pickup button 30E functions as an operating member (recording start/stop operating portion) that is used by the user to instruct the imaging device 10 to start or stop recording the moving images. Note that, in the imaging device 10 according to the present embodiment, the recording start operating portion and the recording stop operating portion are the same operating member (the moving image pickup button 30E) but both portions may be formed as separate operating members.

Furthermore, during a recording period from the instruction to start recording to the instruction to stop recording, based on user operation of the index button 30F (index instruction), the control circuit 110 generates index information relating to the moving image data being recorded, and records the index information such that it is associated with the corresponding moving image data. The index button 30F functions as an operating member (index operating portion) used by the user to input the index instruction.

The index information is time information that shows a time point specified by the user during the recording period. For example, while the moving images are being picked up, the user depresses the index button 30F at an exciting scene during image pickup (a scene of a homerun in baseball, for example) or at a scene that the user likes (a scene of a child's smiling face, for example). By doing this, an index (bookmark) can be attached to a chosen time point of the moving images being recorded, and a specific scene specified by the user during image pickup can be distinguished as a special scene. This type of index information generated during pickup of the moving images is useful as an index when moving images are played back or edited at a later time.

The positioning portion 122 has functions to measure a current position of the imaging device 10 and generate image pickup position information indicating the image pickup position of moving images. The positioning portion 122 is formed, for example, of a global positioning system (GPS) sensor, an angular rate sensor, an acceleration sensor, a magnetic sensor or the like. By using these various types of sensor to measure the position (latitude and longitude etc.) and an orientation etc. of the imaging device 10 when picking up the moving images, the positioning portion 122 generates the image pickup position information indicating the image pickup position of the moving images during pickup of the moving images.

For example, the GPS sensor receives radio waves from a plurality of GPS satellites and, by calculating a distance from each of the GPS satellites, it measures the current position (latitude and longitude) of the imaging device 10. The angular rate sensor and the acceleration sensor detect, respectively, the angular rate and the acceleration when the imaging device 10 moves during image pickup. By detecting a magnetic field surrounding the imaging device 10, the magnetic sensor detects the orientation of the imaging device 10. By analyzing these measurement data (the current position, angular rate, acceleration of the imaging device 10, changes in terrestrial magnetism), the positioning portion 122 calculates the position of the imaging device 10 during pickup of the moving images (namely, the image pickup position) and generates the image pickup position information indicating the image pickup position.

By control of the recording/playback circuit 108 etc., the control circuit 110 records the image pickup position information generated by the above described positioning portion 122 onto the recording medium, such that the image pickup position information is associated with the moving image frames that are picked up at the image pickup position. For example, the positioning portion 122 measures the image pickup position at a predetermined time interval (every few seconds, every few minutes, for example) during the moving image pickup (the recording period), and generate the image pickup position information indicating the image pickup position. The image pickup position information is recorded in a memory 240 (refer to FIG. 4) such that it is associated with frame position information of moving images, for example. The frame position information is information indicating each position of frames that form the moving images, such as an image pickup time, a time code, a number of frames counted from a first frame of the moving images, and a time counted from the start of moving images. Hereinafter, examples are explained in which the image pickup time is used as the frame position information of the moving images, but the image pickup position information is not limited to this example.

As described above, by associating the image pickup position information with the frame position information, the image pickup position information can be associated with the frame of the moving images picked up at the image pickup location thereof. Note that the image pickup position information may be incorporated into data of the moving images to be recorded. In this case, the image pickup information can be directly associated with the frames picked up at the image pickup location thereof.

Further, by controlling the above-described recording/playback mechanism 112, the recording/playback circuit 108 and the drive circuit 114 etc., the control circuit 110 generates a plurality of thumbnail images from the picked up moving images that are picked up during the recording period, and causes a map screen to be displayed on the display panel 20 immediately after recording of the moving images (namely, immediately after the recording stop instruction), or at a timing predetermined by user, for example. The map screen functions as a recorded image verification screen (Rec_Review screen) that is used to check content of the recorded moving images and the image pickup position. This will be explained in more detail later.

2. Functional Structure Of Imaging Device

Figure 4:
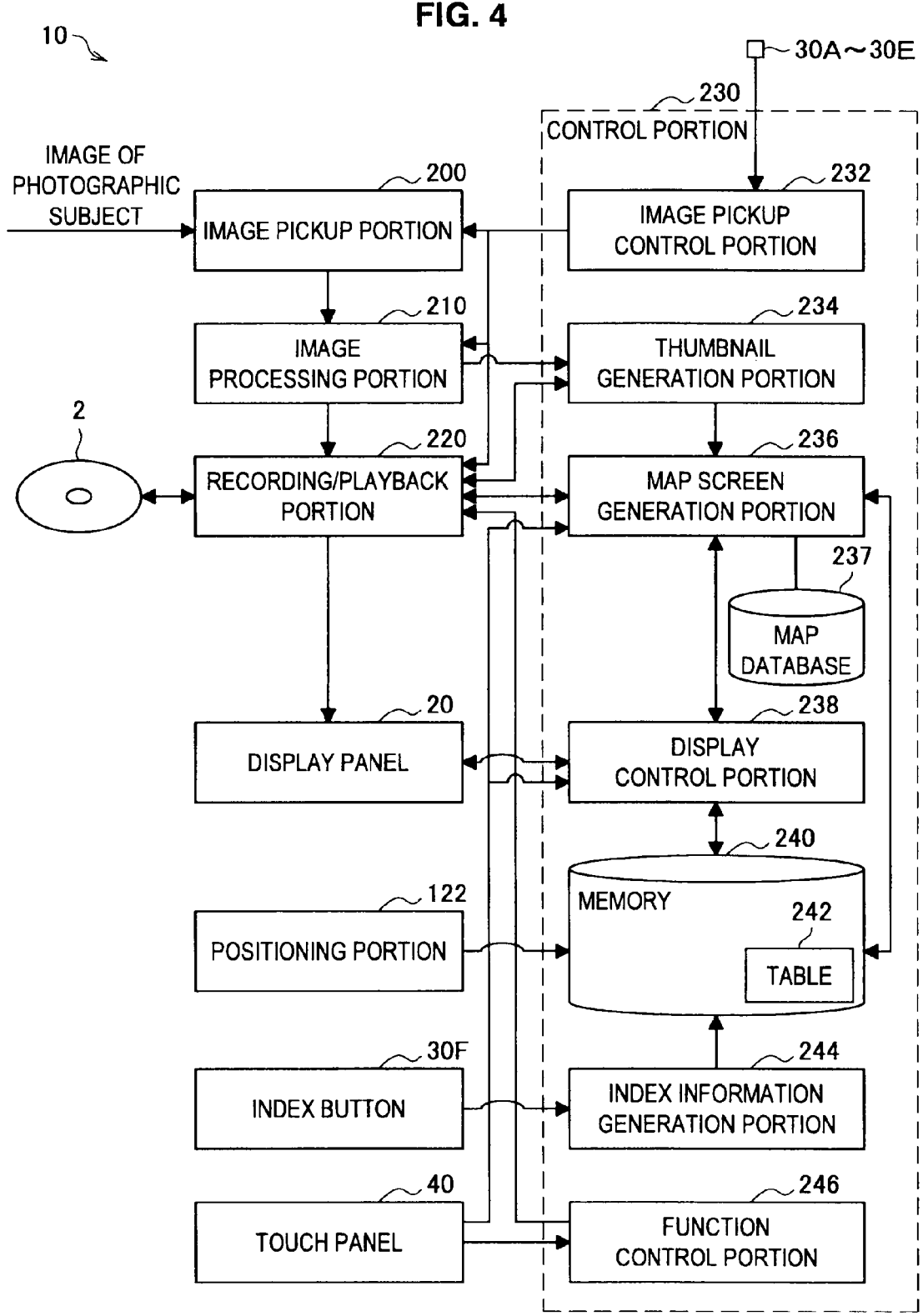
FIG. 4 is a block diagram showing a functional structure of the imaging device according to the embodiment.

Next, a functional structure of the imaging device 10 according to the present embodiment will be explained with reference to FIG. 4. FIG. 4 is a block diagram showing the functional structure of the imaging device 10 according to the present embodiment.

As shown in FIG. 4, the imaging device 10 includes the image pickup portion 200, the image processing portion 210, the recording/playback portion 220, the control portion 230, the display panel 20, the various operating portions 30A to 30F, the touch panel 40 that is the separate operating portion and the positioning portion 122. The control portion 230 includes an image pickup control portion 232, a thumbnail generation portion 234, a map screen generation portion 236, a display control portion 238, a memory 240 that is a memory portion, an index information generation portion 244 and a function control portion 246. Hereinafter, each functional portion of the imaging device 10 will be described.

The image pickup portion 200 includes, for example, the image pickup optical system 14, the lens barrel 16, the image pickup element 18 and drive circuits such as the zoom drive portion 120 etc. shown in FIG. 3. In accordance with control by the image pickup control portion 232, the image pickup portion 200 picks up an optical image of a photographic subject using the image pickup element 18, and outputs an image pickup signal representing the images obtained by the image pickup.

The image processing portion 210 includes, for example, the video image amplifier circuit 100 and the image data processing portion 102 etc. shown in FIG. 3. In accordance with control by the image pickup control portion 232, the image processing portion 210 generates moving images from a plurality of image data by executing predetermined signal processing on the image pickup signal. The moving images are formed of moving image frames continuously generated at a predetermined time period interval (¹⁄₆₀ second, for example).

The recording/playback portion 220 is formed of, for example, the recording/playback circuit 108 and the recording/playback mechanism 112 shown in FIG. 3, and records a variety of data onto the disk-shaped recording medium 2 and plays back a variety of data from the disk-shaped recording medium 2. For example, in accordance with control by the image pickup control portion 232, the recording/playback portion 220 records moving images input from the image processing portion 210 onto the disk-shaped recording medium 2, and also plays back moving images recorded on the disk-shaped recording medium 2. In addition, the recording/playback portion 220 records onto the disk-shaped recording medium 2 thumbnail images that are generated by the thumbnail generation portion 234, which will be explained later. The recording/playback portion 220 further plays back the thumbnail images recorded on the disk-shaped recording medium 2.

The control portion 230 is formed of, for example, the control circuit 110 shown in FIG. 3, and controls all the portions of the imaging device 10. A processor of the control circuit 110 realizes all the functional portions shown in FIG. 4, by executing a computer program that realizes each of the functions to be explained hereinafter.

The image pickup control portion 232 controls an image pickup operation of the imaging device 10. In other words, in accordance with user operation of the various operating portions 30A to 30E, the image pickup control portion 232 controls the image pickup portion 200, the image processing portion 210 and the recording/playback portion 220 in the manner described above, thus causing pickup processing and recording/playback processing of the moving images or still images. For example, when the user presses the moving image pickup button 30E, and thus inputs the instruction to start recording, the image pickup control portion 232 controls the recording/playback portion 220 and starts recording (recording start operation) of the moving images generated by the image pickup portion 200 and the image processing portion 210 onto the disk-shaped recording medium 2. On the other hand, when the user once more presses the moving image pickup button 30E, and thus inputs the instruction to stop recording, the image pickup control portion 232 controls the recording/playback portion 220 and stops recording (recording stop operation) of the moving images.

Note that, the image pickup control portion 232 can switch the operating mode of the imaging device 10 between the moving image pickup mode, the still image pickup mode and the playback mode etc., based on user operation of the mode switchover switch 30D. In the moving image pickup mode and the still image pickup mode, the image pickup processing by the image pickup portion 200 and image processing by the image processing portion 210 is continually performed, and the moving images during image pickup that are obtained by this processing are displayed on the display panel 20 as a live view screen. While watching the live view screen, the user decides a composition of the photographic subject and a shutter chance, and inputs to the imaging device 10 an instruction to record moving images or a still image. In the moving image pickup mode, the moving image data that are picked up and on which image processing is performed during the recording period from the recording start instruction to the recording stop instruction made using the above-described moving image pickup button 30E are recorded onto the disk-shaped recording medium 2. In the still image pickup mode, in correspondence to a release instruction when the user presses the still image pickup button 30B (a so-called shutter button), the still image data that is pickup up at the timing of the release instruction and on which image processing is performed are recorded on to the disk-shaped recording medium 2.

The thumbnail generation portion 234 generates a plurality of thumbnail images from the picked up moving images. For example, the thumbnail generation portion 234 time divides moving images recorded during the recording period from the recording start instruction to the recording stop instruction made by the user into a plurality of sections, and respectively generates thumbnail images representing each section of the moving images. The thumbnail images are still images extracted from the moving images recorded during the recording period. The sections are image sections that are set by time division and have a predetermined time length. The plurality of thumbnail images that represent, respectively, the plurality of sections generated by time division of the moving images are displayed on the map screen, which will be explained later.

More specifically, the thumbnail generation portion 234 generates the thumbnail image for each section of the moving images by respectively extracting a single frame image from each of the time divided moving image sections. For example, when the moving images of a ten minute recording period are uniformly time divided into ten sections, the time length of each of the sections is one minute, and ten thumbnail images are generated. The thumbnail generation portion 234 may time divide all the moving images constantly into a predetermined number (a fixed number) of sections, and generate a predetermined number of thumbnail images. Alternatively, the thumbnail generation portion 234 may fix the time length of the section and generate a chosen number of thumbnail images by changing the number of sections for each of the moving images.

Here, a timing at which the thumbnail generation portion 234 generates the plurality of thumbnail images will be explained. The generation of the thumbnail images may be performed during the recording period of the moving images (during pickup of the moving images) or may be performed after the recording.

In a case in which the thumbnail images are generated during the recording period, the thumbnail generation portion 234 generates the thumbnail images by extracting frames at a predetermined time interval from the moving images output from the image processing portion 210. The thumbnail generation portion 234 then records the thumbnail images and also frame position information (information indicating a number of frames or a time period from the start of moving images, a time code or an image pickup time, for example) of the thumbnail images onto the disk-shaped recording medium 2 or a memory (not shown in the figures) via the recording/playback portion 220. At that time, the thumbnail images and the frame position information may be saved, for example, as a database file (an AV index file etc.).

On the other hand, when the thumbnail images are generated after the end of the recording, the thumbnail generation portion 234 reads out the moving images recorded on the recording medium 2, and time divides the moving images to a plurality of sections at a predetermined time interval. Then, the thumbnail generation portion 234 generates a plurality of thumbnail images by decoding each image at a chosen time point (for example, the beginning, the end, or the middle) of each of the sections, and stores the generated thumbnail images in the memory (not shown in the figures) or the like. Further, from the moving images recorded on the recording medium 2, the thumbnail generation portion 234 can also generate a thumbnail image that corresponds to the image pickup position specified on a map screen that will be described later.

Based on a map database 237 and image pickup position information generated by the positioning portion 122, the map screen generation portion 236 generates the map screen that shows a trajectory of image pickup positions when moving images are picked up. The map screen is a screen that includes a map onto which is mapped a trajectory line indicating the trajectory of the image pickup positions when one or more moving images recorded on the recording media 2 and 4 are picked up. The map database 237 is a database that holds map information that is displayed on the map screen. The map database 237 holds map information of various regions in domestic and foreign countries with a variety of scales.

The positioning portion 122 is formed of a GPS sensor or the like as described above. The positioning portion 122 measures a current position (namely, an image pickup position) of the imaging device 10 when moving images are being picked up, and generates image pickup position information that indicates the measured image pickup position. For example, when the user is capturing moving images by a single series of image pickup operations while moving the imaging device 10 to change the image pickup position, the positioning portion 122 measures a plurality of image pickup positions (for example, the latitude and longitude) at a predetermined time interval (for example, every few seconds or every few minutes), and generates the image pickup position information that indicates these image pickup positions.

The control portion 230 records onto the memory 240 the image pickup position information generated by the positioning portion 122, in association with frames of the moving images that are being picked up. For example, the image pickup position information is stored in an image pickup position table 242 in the memory 240, in association with frame position information of the moving images that are being recorded.

FIG. 5 shows a specific example of the image pickup position table 242. As shown in FIG. 5, the image pickup position table 242 relates to the moving images that are picked up by a single series of image pickup operations. The image pickup position table 242 stores a plurality of image pickup positions (for example, a latitude X and a longitude Y) that are measured at the predetermined time interval when the moving images are being picked up, and image pickup times when the moving images are picked up at the image pickup positions, such that the image pickup positions and the image pickup times are associated with each other. The image pickup time corresponds to the above-described frame position information, and can be used to identify the frame of the moving image picked up at that image pickup time. In the example of FIG. 5, the image pickup positions are associated with the image pickup times at one minute intervals. Therefore, it can be seen that the image pickup positions are measured at one minute intervals when image pickup is performed by the imaging device 10. By associating the image pickup positions with the image pickup times in this manner, the image pickup positions can be associated with the frames of the moving images that are picked up at the corresponding image pickup positions.

Note that, although an example is explained in which the image pickup position information is stored in the image pickup position table 242, the present invention is not limited to this example. For example, the image pickup position information may be recorded on a chosen database file (for example, the AV index file) that is separate from a moving image file, instead of storing it in the image pickup position table 242. Further, the image pickup position information may be embedded in a moving image file that is recorded on the recording medium 2. In this case, the image pickup positions can be directly associated with the moving image frames.

The map screen generation portion 236 reads out the above-described image pickup position information from the image pickup position table 242 of the memory 240, and draws a trajectory line of the image pickup positions on the map based on the read out image pickup position information. Thus, the map screen generation portion 236 generates a map screen 300 (refer to FIG. 6). The map screen 300 has a review function and a screen operation function. The review function is to present to the user the trajectory of the image pickup positions when moving images are picked up, and thumbnail images that are picked up at the respective image pickup positions. The screen operation function is to perform predetermined functions (playback, deletion and rating etc.) on the moving images. The map screen 300 will be described in more detail later. The map screen 300 is displayed on the display panel 20 by the display control portion 238, immediately after the end of the recording of the moving images, or when the user inputs an instruction, for example.

The display control portion 238 controls the display panel 20 to display various types of images and data. For example, the display control portion 238 causes the display panel 20 to display the map screen 300 generated by the map screen generation portion 236 (refer to FIG. 6). Further, when a trajectory line 302 on the map screen 300 displayed on the display panel 20 is traced by the operating body, the touch panel 40 sequentially detects a plurality of points 308 on the traced trajectory line 302. Based on the image pickup position table 242 in the memory 240, the display control portion 238 identifies a plurality of image pickup positions that correspond to the plurality of points 308 on the trajectory line 302 that are detected by the touch panel 40. Then, the display control portion 238 causes the frames of the moving images that are picked up at the respective image pickup positions to be sequentially displayed on the map screen 300 as thumbnail images 310 (refer to FIG. 8 and FIG. 9). A display process of the thumbnail images on the map screen 300 will be explained in more detail later.

During the recording period, the index information generation portion 244 generates index information representing a time point at which the user uses the index button 30F to input an index instruction, and the index information is saved while being associated with the recorded moving images. The above-described index information is time information indicating the time point at which the user inputs the index instruction during the recording period (namely, the time point at which the index button 30F is pressed). The index information functions as an index attached to an exciting scene or a scene that the user likes among the moving images.

During pickup of the moving images (during the recording period), the user presses the index button 30F and inputs the index instruction. In accordance with the input of the index instruction, the index information generation portion 244 generates the index information that includes the time information indicating the time point at which the index instruction is input (for example, the image pickup time, or a time period from the beginning of the moving images, a time code etc.). The index information generation portion 244 then saves the generated index information onto the memory 240 such that it is associated with the moving images. By generating the index information in this way, the index can be attached that represents the user's preferred scenes among the recorded moving images.

Figure 7:
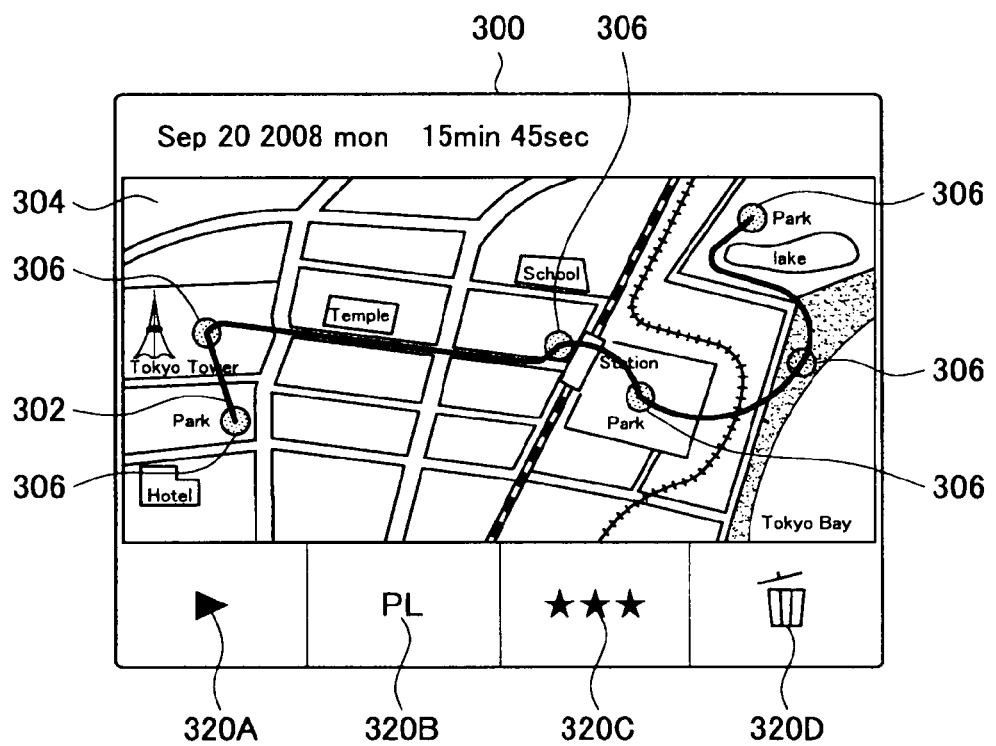
FIG. 7 is a diagram showing a modified example of the map screen according to the embodiment.

The map screen generation portion 236 described above may draw the index marks 306, that indicate the image pickup positions at the time when the index is added during image pickup, on the trajectory line 302 on the map screen 300 (refer to FIG. 7). By doing this, the user who looks at the map screen 300 can ascertain the position to which the index is added on the trajectory of the image pickup positions.

During display of the map screen 300 of the recorded moving images, the function control portion 246 executes predetermined functions with regard to part or all of the moving images, based on the user operation of the touch panel 40. The predetermined functions are selected functions that can be executed on the image data of the moving images, and are, for example, deletion of at least some of the sections of the moving images, playback, attribution of an evaluation value (namely, rating) or playlist creation etc. The function control portion 246 may execute the predetermined functions on all of one of the recorded moving images, or may execute the predetermined functions on some of the sections of the moving images.

Figure 12:
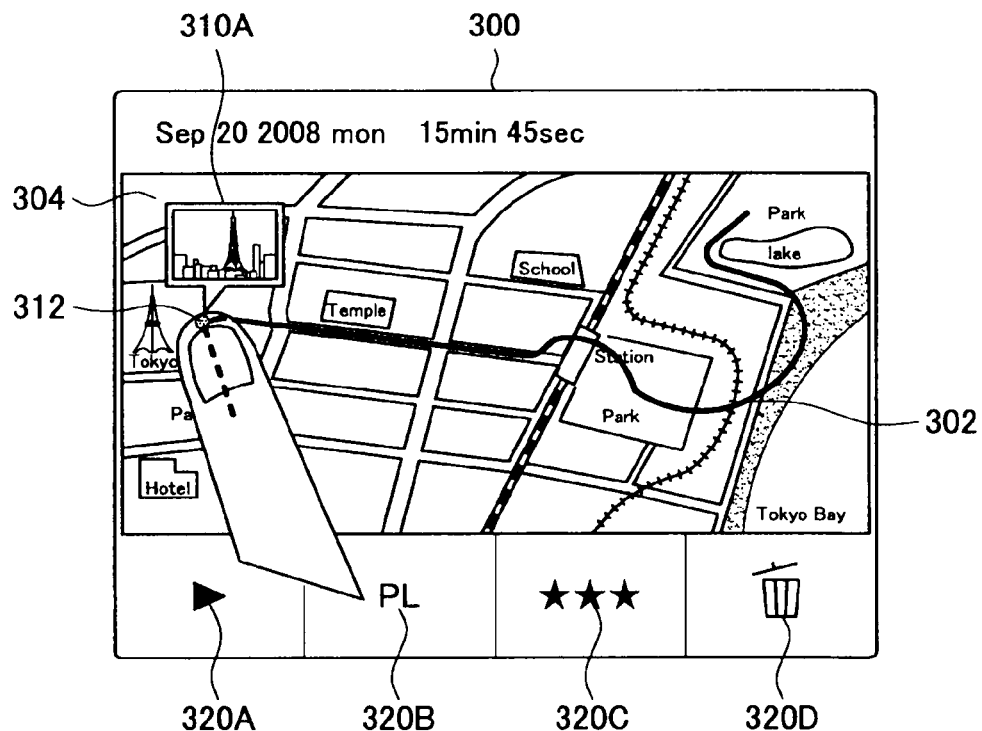
FIG. 12 is a diagram showing an operation to specify a start point on the trajectory line according to the embodiment.
Figure 13:
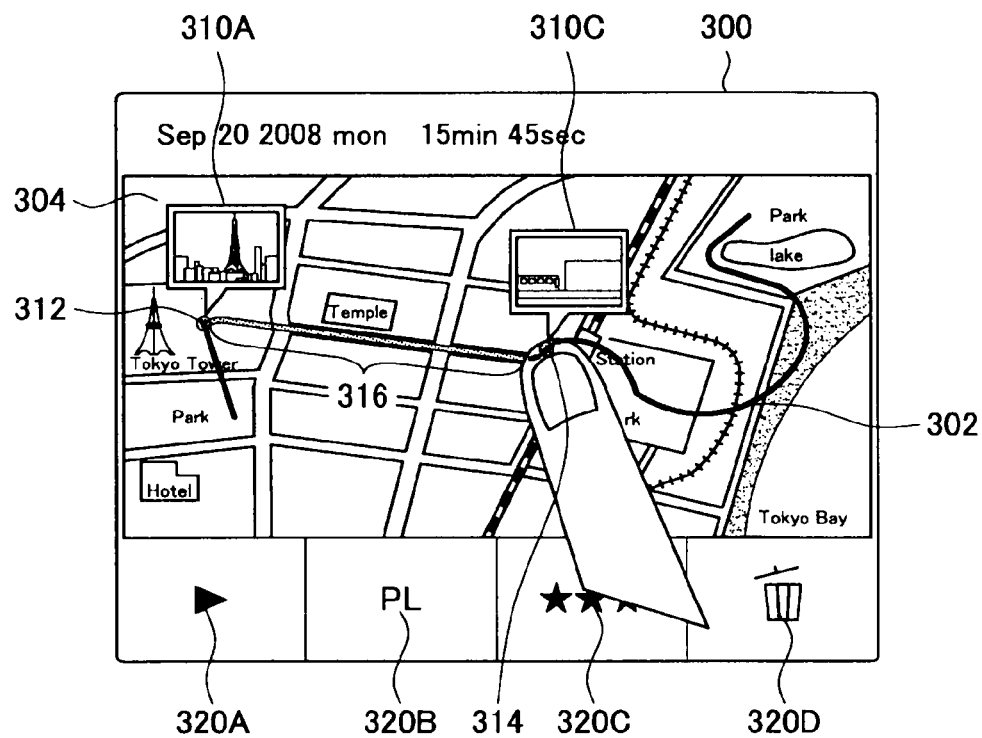
FIG. 13 is a diagram showing an operation to specify an end point on the trajectory line according to the embodiment.
Figure 14:
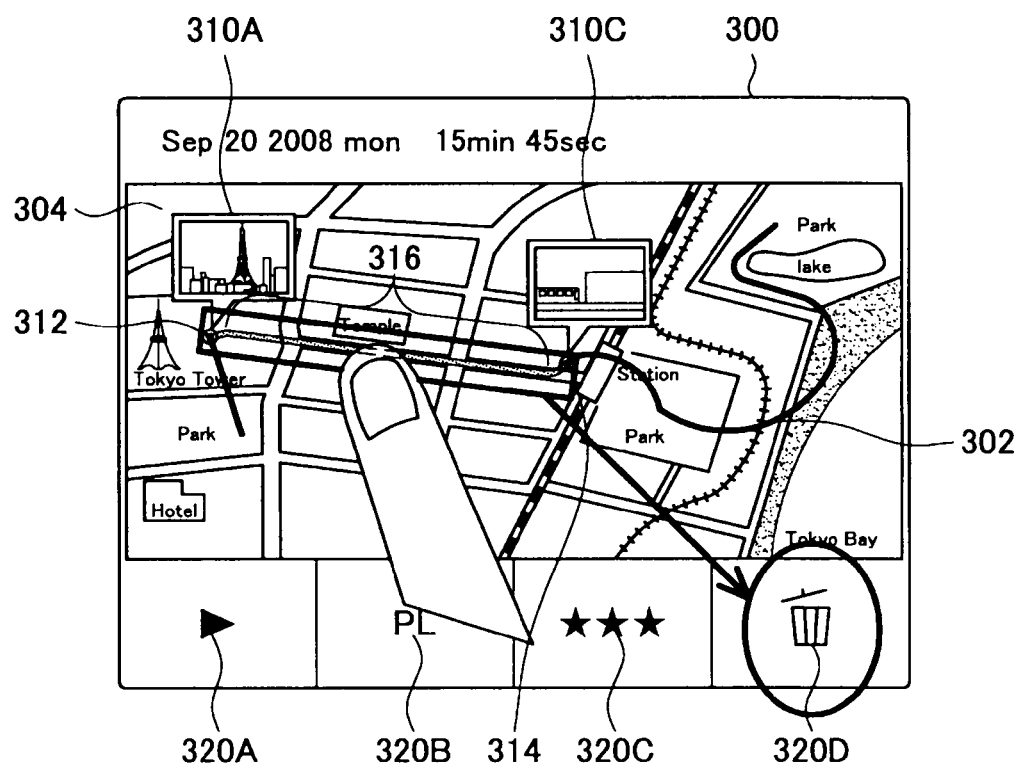
FIG. 14 is a diagram showing an operation to drag and drop, to a delete icon, a section from the start point to the end point of the trajectory line according to the embodiment.

Specifically, during display of the map screen 300, the user uses the touch panel 40 to perform a predetermined operation to the trajectory line 302 on the map screen 300, specifies a section 316 on the trajectory line 302, and further specifies one of the function icons 320 on the map screen 300 (refer to FIG. 12 to FIG. 14). Then the function control portion 246 obtains a section of image pickup position corresponding to the section 316 on the trajectory line 302 which is specified by the user, and further obtains a section of the moving images picked up in the section of the image pickup position (the range of frames that forms the moving images) based on the image pickup position information stored in the memory 240. The function control portion 246 performs the predetermined functions corresponding to the function icon 320, which are specified by the user, to the section of the moving images.

When the user uses the touch panel 40, for example, to specify the arbitrary section on the trajectory line 302 on the map screen 300 and a delete icon 320D, the function control portion 246 performs the function corresponding to the delete icon 320D (that is a deletion function), on the section of the moving images corresponding to the specified section of the trajectory line. In other words, the function control portion 246 partially deletes data in the section of the moving image from the recording medium 2. In this manner, when the user uses the touch panel 40 to specify the preferred range of image pickup positions and the function icon 320 on the map screen 300, the imaging device 10 performs the predetermined functions such as deletion, rating, playback, and playlist creation on the section of the moving images.

3. Display Example Of Map Screen

Figure 6:
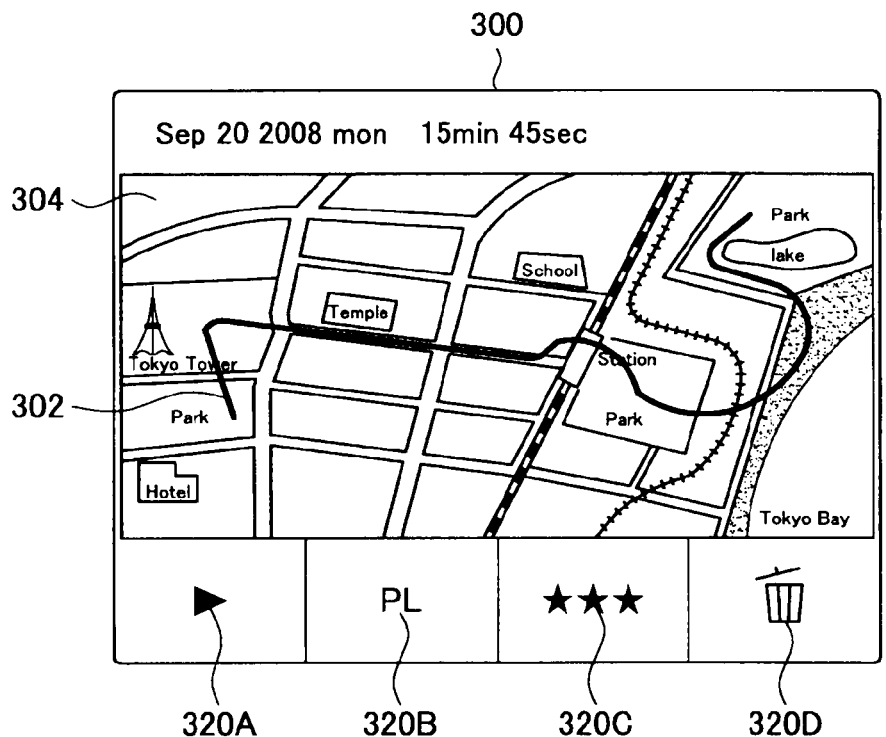
FIG. 6 is a diagram showing a display example of a map screen according to the embodiment.

Next, a display example of the map screen 300 according to the present embodiment will be explained with reference to FIG. 6. FIG. 6 is a diagram showing the display example of the map screen 300 according to the present embodiment.

As shown in FIG. 6, the map screen 300 is a screen including a map 304 on which is drawn the trajectory line 302 that indicates the trajectory of the image pickup positions when moving images are picked up. For example, on the map screen 300 shown in FIG. 6, the map 304 of an area including parks, Tokyo Tower, a train station, and Tokyo Bay etc. is displayed. The trajectory line 302 (which is a single line) is displayed within the map 304, and the trajectory line 302 indicates a movement trajectory when the user sequentially picked up moving images of the aforementioned area using the imaging device 10. The trajectory line 302 passes through the points, namely, the parks, Tokyo Tower, the train station, Tokyo Bay, and the lake etc., and it can be seen that the user sequentially captured a single set of moving images while the user moved through these points in that order.

Note that the trajectory line 302 (which is a single line) on the map screen 300 indicates the trajectory of the image pickup positions relating to a single set of moving images (which is also referred to as a clip) sequentially picked up by a series of image pickup operations. In the example shown in FIG. 6, only the trajectory line 302 (which is a single line) corresponding to the single set of moving images is displayed on the map screen 300. However, a plurality of the trajectory lines 302 that respectively correspond to a plurality of moving images may be displayed on the single map screen 300.

The map screen 300 described above is generated based on the image pickup position information that is associated with the moving images. As described above, the image pickup position information indicates a plurality of image pickup positions that are measured at the predetermined time interval when the moving images are picked up by the imaging device 10. The image pickup position information is recorded on the memory 240 of the imaging device 10, such that it is associated with the frame position information of the moving images. The imaging device 10 plots on the map 304 the plurality of image pickup positions indicated by the image pickup position information, and connects the plotted points to draw the trajectory line 302.

Further, in addition to the map 304 on which the trajectory line 302 is drawn in the manner described above, the map screen 300 includes the plurality of function icons 320 that are GUI parts. The function icons 320 are used to perform the predetermined functions (deletion, playback, rating, and playlist creation etc.) on the moving images. For example, a playback icon 320A, a playlist icon 320B, a rating icon 320C and a delete icon 320D are provided as the function ions 320, and these icons will be explained later.

The map screen 300 including the map 304 on which the trajectory line 302 is drawn is displayed on the display panel 20 of the imaging device 10, immediately after the end of the recording of the moving images, or when the user inputs an instruction to display the map screen 300. By displaying the map screen 300, the user can easily and adequately ascertain the trajectory of the image pickup positions when the moving images are picked up. As a result, the user can spatially ascertain an image pickup situation and a photographic subject when the moving images were picked up.

FIG. 7 shows a modified example of the map screen 300. A plurality of index marks 306 are displayed on the trajectory line 302 on the map screen 300 shown in FIG. 7. The index marks 306 indicate image pickup positions at time points at which indices are added by the user during pickup of the moving images. As described above, the user can add an index to a moving image by depressing the index button 30F at an exciting scene during pickup of the moving images or at a scene that the user likes. Such indices are particularly useful when verifying or editing long-time moving image content.

As shown in FIG. 7, the index marks 306 that indicate image pickup positions when the above-described indices are added are displayed on the trajectory line 302 on the map screen 300. As a result, among the pickup positions of the moving images, the user can ascertain the image pickup positions to which the indices are added, and can verify the position of an exciting scene or a scene that the user likes. In addition, when the moving images are edited using the map screen 300 (refer to FIG. 12 to FIG. 16), which will be described later, the user can use the index marks 306 as a guide to specify the above-described section of the moving images to be edited. For example, the user can partially delete the moving images such that the exiting scene and the like to which the indices are added are not deleted.

4. Display Example Of Thumbnail Images On Map Screen

Figure 8:
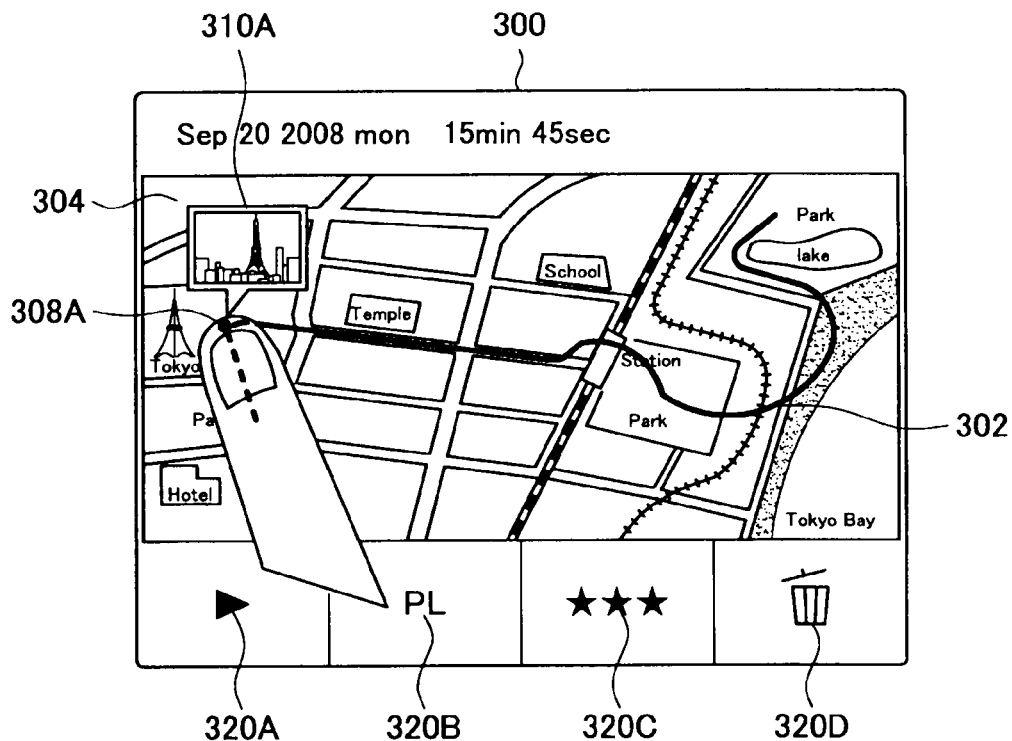
FIG. 8 is a diagram showing a display example when a user specifies a point on a trajectory line with a finger, on the map screen according to the embodiment.

Next, the thumbnail images 310 of the moving images displayed on the map screen 300 will be explained with reference to FIG. 8. FIG. 8 shows a display example when the user specifies a point on the trajectory line 302 with a finger, on the map screen 300 according to the present embodiment.

As shown in FIG. 8, the user specifies a point 308A on the trajectory line 302 with an operating body (for example, his/her finger) during display of the map screen 300. In response to this, the touch panel 40 detects the point 308A specified by the user, and the display control portion 238 causes a thumbnail image 310A, which is picked up at an image pickup position corresponding to the point 308A, to be displayed in the vicinity of the point 308A on the map screen 300. In the example shown in FIG. 8, when the point 308A in the vicinity of Tokyo Tower on the trajectory line 302 is specified, the thumbnail image 310A of Tokyo Tower is displayed as a pop-up image. The thumbnail image 310A of Tokyo Tower is the thumbnail image 310 of the moving image picked up at the image pickup position corresponding to the point 308A that is specified by the user.

In a case where the point 308A on the trajectory line 302 is specified, a method for displaying on the map screen 300 the thumbnail image 310A that corresponds to the specified point 308A will be explained specifically.

The point 308 on the trajectory line 302 corresponds to the image pickup position of the moving image, and the image pickup position of the moving image and the frame position of the moving image picked up at that image pickup position are associated with each other in the image pickup position table 242, for example. Therefore, the display control portion 238 obtains the image pickup position corresponding to the specified point 308A, and obtains the frame position (for example, the image pickup time, the time code or the like) that is associated with the image pickup position. Further, the display control portion 238 extracts the frame of the moving image identified by the frame position, as a thumbnail image 310A corresponding to the specified point 308A.

However, as described above, when the moving images are picked up, the positioning portion 122 does not constantly measure the image pickup position, but measures the image pickup position at the predetermined time interval. For that reason, the image pickup position information is associated only with some frames of the moving images. Therefore, the image pickup position information is not associated with all the frames of the moving images. As a result, when the image pickup position information is not added to the specified point 308A, the frame that accurately corresponds to the point 308A may not be identified. To address this, the display control portion 238 may use, for example, first and second methods to be described below, in order to obtain the thumbnail image 310A that corresponds to the specified point 308A.

With the first method, the display control portion 238 selects the image pickup position that is closest to the specified point 308A, from among the plurality of image pickup positions measured during pickup of the moving images. Then, the display control portion 238 extracts the frame that is associated with the closest image pickup position, as the thumbnail image 310A corresponding to the point 308A, and displays the extracted frame on the map screen 300. The first method is useful when the image pickup positions are measured at short intervals.

On the other hand, when the image pickup positions are measured at longer intervals, in other words, when there are few points to which the image pickup position information is added, the second method may be used. With the second method, the display control portion 238 interpolates the frame position information of the specified point 308A, using the frame position information (for example, the image pickup time) of two points to which the image pickup position information is added. For example, if image pickup times Ta and Tb of points A and B to which the image pickup position information is added, and distances La and Lb between the points A and B and the point 308A are used, it is possible to interpolate an image pickup time Tx of the point 308A. Then, the display control portion 238 extracts the frame identified by the interpolated frame position as the thumbnail image 310 that corresponds to the point 308A, and displays the extracted frame on the map screen 300.

With the above-described methods, it is possible to obtain the thumbnail image 310 that corresponds to the point 308A specified by the user, and to display the obtained thumbnail image 310 on the map screen 300. Thus, when the user specifies the point 308A on the trajectory line 302 on the map screen 300, the user can display the thumbnail image 310A picked up at the image pickup position that corresponds to the point 308A. By looking at the thumbnail image 310, the user can ascertain the thumbnail image 310A of the moving image in association with the image pickup position.

5. Display Example Of Thumbnail Images When Trajectory Line Is Traced

Figure 9:
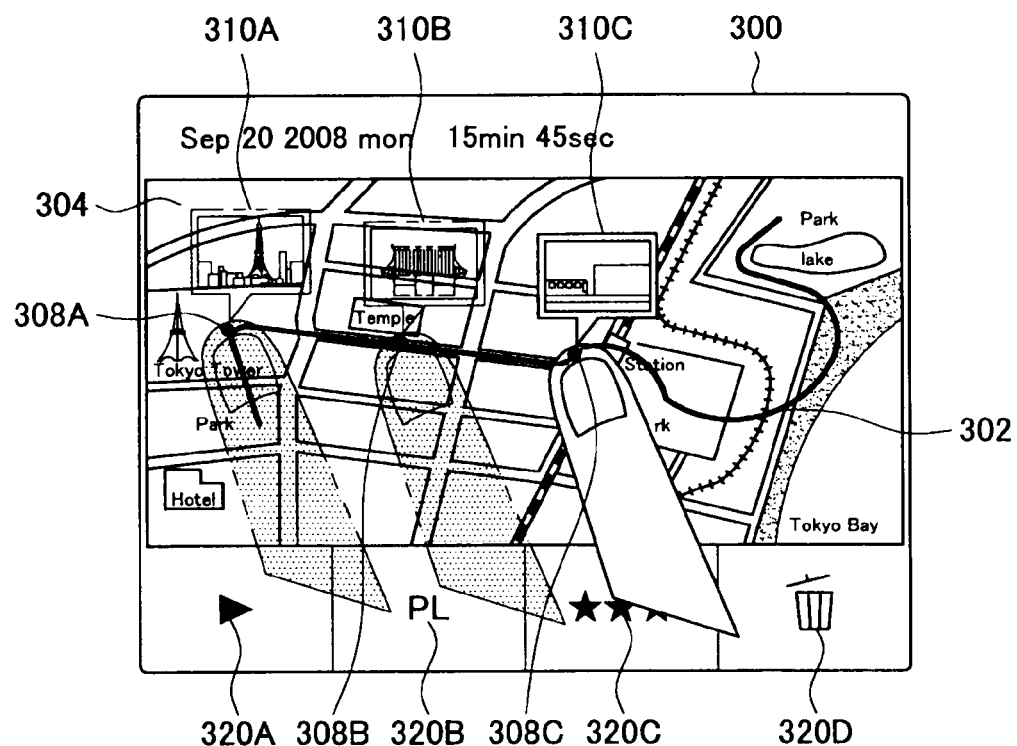
FIG. 9 is a diagram showing a display example when the user traces the trajectory line with a finger, on the map screen according to the embodiment.

Next, with reference to FIG. 9, an example will be explained in which the thumbnail images 310 at respective image pickup positions are sequentially displayed on the map screen 300. FIG. 9 shows a display example when the user traces the trajectory line 302 with a finger, on the map screen 300 according to the present embodiment.

As shown in FIG. 9, when the user traces the trajectory line 302 on the map screen 300 with an operating body (for example, his/her finger), the thumbnail image 310A, a thumbnail image 310B and a thumbnail image 310C that respectively correspond to the point 308A, a point 308B and a point 308C on the traced trajectory line 302 are sequentially displayed along the trajectory line 302 on the map screen 300. In this case, the plurality of thumbnail images 310A, 310B and 310C are not displayed at the same time, but only one of the thumbnail images 310 is displayed that corresponds to the point 308 (namely, the position of the trajectory line 302 that the user currently specifies with his/her finger) on the trajectory line 302 that is currently traced by the user. When the position of the finger of the user moves, the thumbnail images 310B and 310C of the points 308A and 308B, which are currently not specified, are removed, and the thumbnail image 310C of the newly specified point 308C is displayed.

The display process of the thumbnail images 310 performed in the above-described manner will be explained in more detail. When the user traces the trajectory line 302 on the map screen 300, the touch panel 40 sequentially detects coordinate positions of the plurality of points 308A, 308B and 308C on the traced trajectory line 302. In response to this, the display control portion 238 obtains a plurality of image pickup positions that respectively correspond to the coordinate positions of the plurality of points 308A, 308B and 308C detected by the touch panel 40. Further, similarly to the example in FIG. 8, based on the image pickup position table 242, the display control portion 238 extracts a plurality of frames of the moving images that respectively correspond to the plurality of image pickup positions, as the plurality of thumbnail images 310A, 310B and 310C, and causes the extracted plurality of frames to be sequentially displayed on the map screen 300.

At this time, the display control portion 238 may display the thumbnail images 310 while sequentially decoding and resizing the frames of the moving images recorded on the recording medium 2. Alternatively, the thumbnail generation portion 234 may generate in advance a plurality of the thumbnail images 310 that represent the moving images, and may save them on a recording medium such as the memory 240. Then, from among the thumbnail images 310 saved on the recording medium, the thumbnail images 310 that correspond to the points 308 on the traced trajectory line 302 may be sequentially selected and displayed.

As described above, when the trajectory line 302 is traced on the map screen 300, the thumbnail images 310A to 310C that respectively correspond to the points 308A to 308C on the traced trajectory line 302 are sequentially displayed along the trajectory line 302. Thus, by tracing a desired section of the trajectory line 302 while looking at the map screen 300, the user can sequentially see the thumbnail images 310 of the moving images picked up during that section. Accordingly, while verifying an image pickup trajectory, the user can easily and adequately ascertain changes in content of the moving images of the section corresponding to the image pickup trajectory.

6. Scaled Up/Scaled Down Display Of Map Screen

Figure 10:
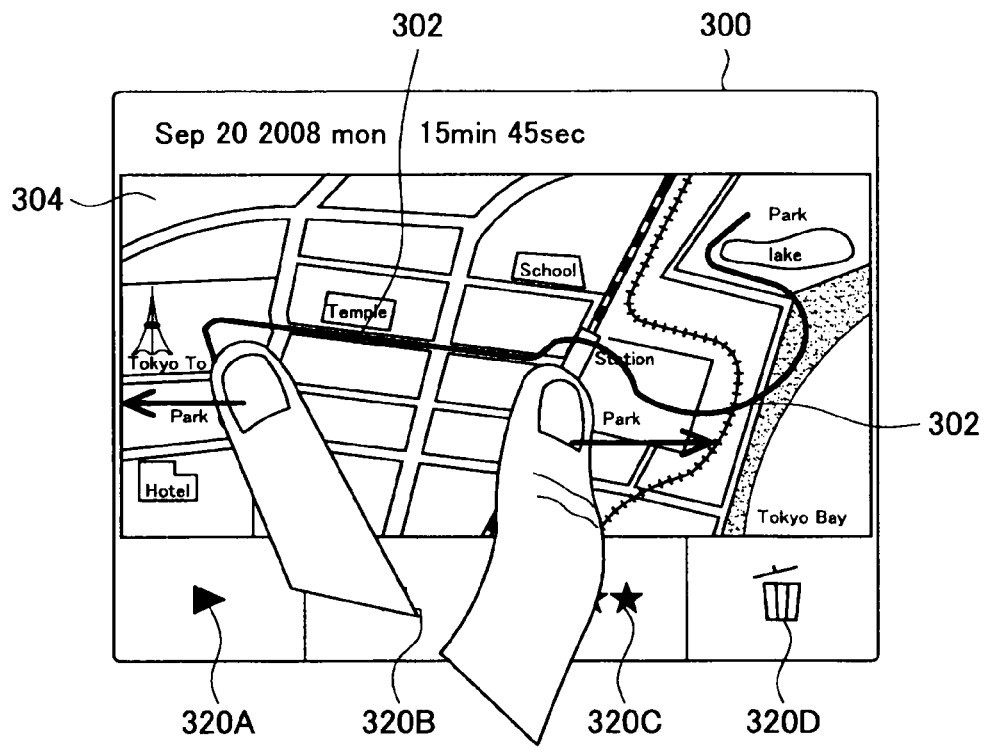
FIG. 10 is a diagram showing a pinch out operation on the map screen according to the embodiment.
Figure 11:
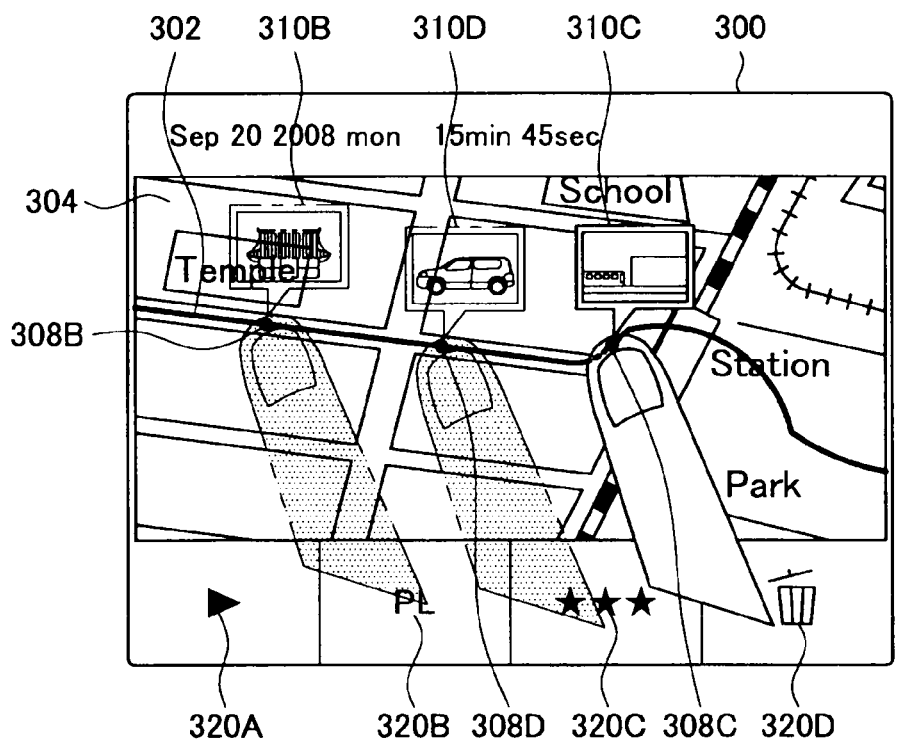
FIG. 11 is a diagram showing the map screen that is enlarged and displayed by the pinch out operation according to the embodiment.

Next, with reference to FIG. 10 and FIG. 11, an example will be described in which the map 304 on the map screen 300 is scaled and displayed by a predetermined operation (pinch in/pinch out operation) on the map screen 300. FIG. 10 shows a pinch out operation on the map screen 300, and FIG. 11 shows the map screen 300 that is scaled up and displayed by the pinch out operation.

As shown in FIG. 10, when the pinch out operation is performed, while touching chosen positions on the map screen 300 with two fingers, the user moves the two fingers such that they are separated from each other in the left-and-right direction. The touch panel 40 can detect not only positions on the map screen 300, but also a movement trajectory of an operating body such as a finger. Therefore, the touch panel 40 can also detect the pinch out operation such as that shown in FIG. 10.

When this type of pinch out operation is detected by the touch panel 40, the display control portion 238 changes the scale of the map screen 304 displayed on the map screen 300, in accordance with the operation amount. As shown in FIG. 11, the display control portion 238 scales up and displays the map screen 304, centering on a section on which the pinch out operation is performed. For example, the scale of the map 304 shown in the FIG. 11 is twice the scale of the map 304 shown in FIG. 10. Although not shown in the figures, if the user performs a pinch in operation on the map screen 300, the display control portion 238 scales down and displays the map 304 in accordance with the operation amount, centering on a section on which the pinch in operation is performed.

With this type of pinch in/pinch out operation, the user can freely adjust the scale of the map 304 displayed on the map screen 300. For example, when the user wants to look at a particular section on the map screen 300 in more detail, the user may perform the pinch out operation to scale up and display the particular portion. Thus, the user can more closely verify an image pickup environment around the particular section and layout of the trajectory line 302.

Further, in accordance with the scale of the map 304 displayed on the map screen 300, the display control portion 238 changes the interval between the points 308 at which the thumbnail images 310 are displayed when the trajectory line 302 is traced. For example, when the scale of the map 304 is increased by the above-described pinch out operation, the interval between the points 308 at which the thumbnail images 310 are displayed is narrowed (refer to FIG. 11). On the other hand, when the scale of the map 304 is reduced by the above-described pinch in operation, the interval between the points 308 at which the thumbnail images 310 are displayed is widened (refer to FIG. 9).

Specific examples will be explained using the examples of the map screen 300 shown in FIG. 9 and FIG. 11. On the map screen 300 shown in FIG. 9, when the user traces the trajectory line 302 from the point 308B to the point 308C, the thumbnail image 310B is displayed at the point 308B and the thumbnail image 310C is displayed at the point 308C. However, on the section between the point 308B and the point 308C, the thumbnail image 310 is not displayed. Therefore, the interval between the points 308 at which the thumbnail images 310 are displayed is a distance between the point B and the point C (for example, 100 m).

The scale of the map screen 300 shown in FIG. 11 is twice the scale of the map screen 300 shown in FIG. 9. In the example shown in FIG. 11, when the user traces the trajectory line 302 from the point 308B to the point 308C, not only the thumbnail images 310B and 310C are displayed at the points 308B and 308C respectively, but also a thumbnail image 310D is displayed at a point 308D, which is a middle point between the point 308B and the point 308C. Therefore, the interval between the points 308 at which the thumbnail images 310 are displayed is a distance between the point 308B and the point 308D (for example, 50 m).

As described above, the interval between the points 308 at which the thumbnail images 310 are displayed is narrower on the map screen 300 shown in FIG. 11 than on the map screen 300 shown in FIG. 9. Accordingly, on the scaled up map screen 300 shown in FIG. 11, the number of the thumbnail images 310 that are displayed when a predetermined range of the trajectory line 302 is traced is increased. In other words, the thumbnail images 310 are displayed at a narrower interval. As a result, by tracing the trajectory line 302 on the scaled up map screen 300 shown in FIG. 11, the user can verify in detail the content of the moving images picked up within a desired narrow range. On the other hand, on the scaled down map screen 300 shown in FIG. 9, the number of the thumbnail images 310 that are displayed when the predetermined range of the trajectory line 302 is traced is reduced. In other words, the thumbnail images 310 are displayed at a wider interval. As a result, by tracing the trajectory line 302 on the scaled down map screen 300 shown in FIG. 9, the user can schematically ascertain changes in the whole content of all the moving images picked up in a wide range.

7. Editing Of Moving Images Using Map Screen

Hereinafter, the editing of moving images using the map screen 300 will be explained. As described above, the map screen 300 is provided with both (a) the review function that verifies the content of the moving images, and (b) the image operating functions that execute predetermined functions on at least part of the moving images. The image operating functions is embodied by the function icons 320 that are displayed on the map screen 300. The image operation functions of the map screen 300 will be explained in more detail.

As shown in FIG. 6 to FIG. 11, a plurality of function icons 320 is displayed on the map screen 300, in addition to the map 304 in which the above-described trajectory line 302 is drawn. The function icons 320 are GUI parts that serve to execute predetermined functions (deletion, rating, playback, playlist creation, etc.) on the recorded moving images. In the example shown in FIG. 6, for example, as the four function icons 320, the playback icon 320A, the playlist icon 320B, the rating icon 320C and the delete icon 320C are displayed on a lower portion of the map screen 300.

The playback icon 320A is a function icon that executes a function (playback function) that plays back at least part of the moving images recorded on the disk-shaped recording medium 2. The playlist icon 320B is a function icon for executing functions to create playlists using at least a part of sections of the moving images. The rating icon 320C is a function icon that executes a function (rating function) that attributes an evaluation value (a five-level evaluation value, for example) to at least some of the sections of the moving images recorded on the disk-shaped recording medium 2. The delete icon 320D is a function icon that executes a function (delete function) that deletes at lease some of the sections of the moving images recorded on the disk-shaped recording medium 2.

By specifying the above-described function icons 320 on the map screen 300, the user can execute, on the moving images recorded on the recording medium 2, the function corresponding to the selected function icon 320. In the manner described above, the touch panel 40 is provided on the display panel 20 of the imaging device 10, and the touch panel 40 detects the position (screen position) specified by the user on the display screen. The user operation on the display panel 20, such as the specifying the section on the trajectory line 302 or the specifying the function icons 320 by the user, can be detected by the touch panel 40.

During display of the map screen 300, the imaging device 10 detects, by the touch panel 40, the presence or absence of the specifying the function icons 320 by the user. As a result, when the position on the map screen 300 detected by the touch panel 40 during display of the map screen 300 corresponds to the display position of one of the function icons 320, it can be said that the user has selected the corresponding function icon 320. In this case, the imaging device 10 determines that an instruction to execute the function corresponding to this function icon 320 has been input, and executes the function corresponding to this function icon 320 that is selected on at least some of the sections of the moving images.

For example, during display of the map screen 300, if the user touches the playback icon 320A, the imaging device 10 plays back the moving images corresponding to the map screen 300 from the beginning, for example, and displays the moving images on the display panel 20. Further, if the user taps the playback icon 320A after specifying a point 308 on the trajectory line 302 on the map screen 300, the imaging device 10 may playback the moving images starting from the frame position corresponding to the specified point 308.

In addition, during display the map screen 300, if the user touches the playlist icon 320B, the imaging device 10 creates a playlist including the moving images corresponding to the map screen 300. The playlist is a list to playback one or more moving images selected by the user. In accordance with the predetermined user operation after the playlist icon 320B is touched, the imaging device 10 may create a new playlist including the moving images corresponding to the map screen 300, or add the moving images into the existing playlist.

Additionally, during display of the map screen 300, if the user touches the rating icon 320C, the imaging device 10 attributes the evaluation value specified by the user to the moving images recorded on the disk-shaped recording medium 2. For example, when the user touches the rating icon 320C, the imaging device 10 may display an input screen (not shown in the figures) to input the evaluation value, and the evaluation value specified on the input screen may be attributed to the moving images. Information of the input evaluation value is stored in a memory etc. in association with the moving images. The evaluation value can be attributed in multiple stages, for example, from level one to level five.

Furthermore, during display of the map screen 300, if the user touches the delete icon 320D, the imaging device 10 deletes the moving images corresponding to the map screen 300. In this case, the imaging device 10 may delete directly the moving images in accordance with the touch of the delete icon 320D. Alternatively, the imaging device 10 may display a confirmation dialog box (not shown in the figures) to confirm whether or not to perform deletion, and delete the moving images after confirmation by the user. Further, as a method to delete the moving images, for example, in addition to a method to completely delete the data of the moving images recorded on the disk-shaped recording medium 2, there is also a method in which the data of the moving images are moved to a delete list and the moved data are deleted after holding them for a predetermined period of time, or a method in which the data of the moving images are actually saved but the data are not shown to the user and so on.

Examples of executing the predetermined functions on the whole of the moving images corresponding to the map screen 300 are described above, but the predetermined functions can be executed partially on some sections of the moving images.

FIG. 12 to FIG. 14 are diagrams each showing a user operation when a section that is part of moving images is deleted using the map screen 300. FIG. 12 shows an operation to specify a start point 312 on the trajectory line 302. FIG. 13 shows an operation to specify an end point 314 on the trajectory line 302. FIG. 14 shows an operation to drag and drop, to the delete icon 320D, a section 316 from the start point 312 to the end point 314.

As described above, when the trajectory line 302 on the map screen 300 is traced, the thumbnail images 310 at respective image pickup positions are sequentially displayed. The user determines a section of the moving images that he/she wants to edit, while looking at the thumbnail images 310 and the image pickup positions on the map 304. When the user edits the section of the moving images on the map screen 300, the user first specifies the start point 312 on the trajectory line 302 as shown in FIG. 12, and then specifies the end point 314 on the trajectory line 302 as shown in FIG. 13. The section 316 of the trajectory line 302 that is specified by the start point 312 and the end point 314 corresponds to the section of the moving images that the user wants to edit. After that, the user drags and drops, to the delete icon 320D, the section 316 of the trajectory line 302 between the start point 312 and the end point 314 specified in the above-described manner, while sliding his/her finger on the map screen 300. The above-described operation to specify the start point 312 and the end point 314, and the above-described operation to drag and drop the section 316 to the delete icon 320D correspond to a predetermined operation to partially delete the section of the moving images on the map screen 300. In response to this predetermined operation, the imaging device 10 deletes the section of the moving images that corresponds to the section 316 specified by the start point 312 and the end point 314.

In order to perform the above-described partial deletion of the moving images, a process performed by the imaging device 10 will be described in more detail. First, in response to the operation to specify the start point 312 by the user, the touch panel 40 detects a coordinate position of the specified start point 312 of the trajectory line 302 (refer to FIG. 12). Then, in response to the operation to specify the end point 314 by the user, the touch panel 40 detects a coordinate position of the specified end point 314 of the trajectory line 302 (refer to FIG. 13). As a method by which the touch panel 40 detects the specified start point 312 and the end point 314 in response to the operation to specify the start point 312 and the end point 314 by the user in the above-described manner, three methods (a) to (c) described below can be exemplified.

(a) Detection of Touch Pressure

For example, the pressure-sensitive touch panel 40 can detect a pressure when the user presses a chosen point on the screen. Therefore, when the user strongly presses a point on the trajectory line 302 using an operating body such as a finger, the touch panel 40 detects the pressure. When the pressure is equal to or more than a predetermined value, the touch panel 40 determines that the operation to specify the start point 312 or the end point 314 is performed. Then, the touch panel 40 detects the strongly pressed point as the start point 312 or the end point 314.

(b) Detection of Touch Time

The touch panel 40 can detect the time (touch time) during which the user touches a chosen point on the screen. Therefore, when the user continuously touches a point on the trajectory line 302 using an operating body such as a finger, the touch panel 40 detects the time during which the user continuously touches the point. When the touch time is equal to or more than a predetermined threshold value, the touch panel 40 determines that the operation to specify the start point 312 or the end point 314 is performed. Then, the touch panel 40 detects the point that is touched for a long time as the start point 312 or the end point 314.

(c) Detection of Number of Taps (Touches)

The touch panel 40 can detect the number of taps when the user taps a chosen point on the screen continuously within a predetermined period of time. Therefore, when the user taps a point on the trajectory line 302 a predetermined number of times (a double tap, for example) using an operating body such as a finger, the touch panel 40 determines, based on the number of taps, that the operation to specify the start point 312 or the end point 314 is performed. Then, the touch panel 40 detects the point that is double tapped as the start point 312 or the end point 314.

In this manner, the touch panel 40 can detect the start point 312 or the end point 314 on the trajectory line 302 specified by the user. Note that, after the user has specified the start point 312 by the above-described predetermined operation, if the user performs a similar operation, the operation can be determined as the operation to specify the end point 314. Note also that the user need not necessarily specify both the start point 312 and the end point 314. For example, when a leading end (which corresponds to the beginning of the moving images) of the trajectory line 302 is constantly set to be the start point 312, the user can specify the section 316 by just specifying the end point 314.

Additionally, let us consider a case in which the user traces the trajectory line 302 from the start point 312, in order to specify the end point 314 after specifying the start point 312. In this case, as shown in FIG. 13, the section 316 of the trajectory line 302 on the map screen 300 from the start point 312 to the point that has just been traced is in a selected state, and the section 316 is displayed such that it can be distinguished from the other sections of the trajectory line 302. In the example shown in FIG. 13, the section 316 of the trajectory line 302 in the selected state is displayed using a color different from that of the other sections. Thus, the user can recognize the selected section on the trajectory line 302. This makes it easy for the user to determine an editing section.

When the start point 312 and the end point 314 on the trajectory line 302 are specified in this manner, the thumbnail images 310A and 310C picked up at image pick up positions that respectively correspond to the start point 312 and the end point 314 are displayed on the map screen 300. Thus, the user can verify the content of the moving images of the specified start point 312 and the end point 314.

After that, as shown in FIG. 14, the user drags and drops the section 316 between the start point 312 and the end point 314 to the delete icon 320D on the map screen 300. When the drag and drop operation is performed, the touch panel 40 detects the position on the map screen 300 at which the section 316 is dropped. When the position at which the section 316 is dropped corresponds to the display position of the delete icon 320D among the plurality of function icons 320, it is indicated that the user has specified the delete icon 320D. In this case, the function control portion 246 of the imaging device 10 identifies the section of the moving images that corresponds to the section 316 specified by the start point 312 and the end point 314, and deletes the identified section of the moving images recorded on the recording medium 2.

The case in which the moving images are partially deleted is explained above. However, when some of the sections of the moving images are played back, or when an evaluation value is attributed to some of the sections of the moving image, an operation can be performed in a similar manner. In the case of partial playback, the imaging device 10 plays back the moving images of the section corresponding to one or more of the thumbnail images 310 specified by the user. In the case of partial rating, the imaging device 10 partially attributes the evaluation value to the moving images of the section corresponding to one or more of the thumbnail images 310 specified by the user.

Figure 15:
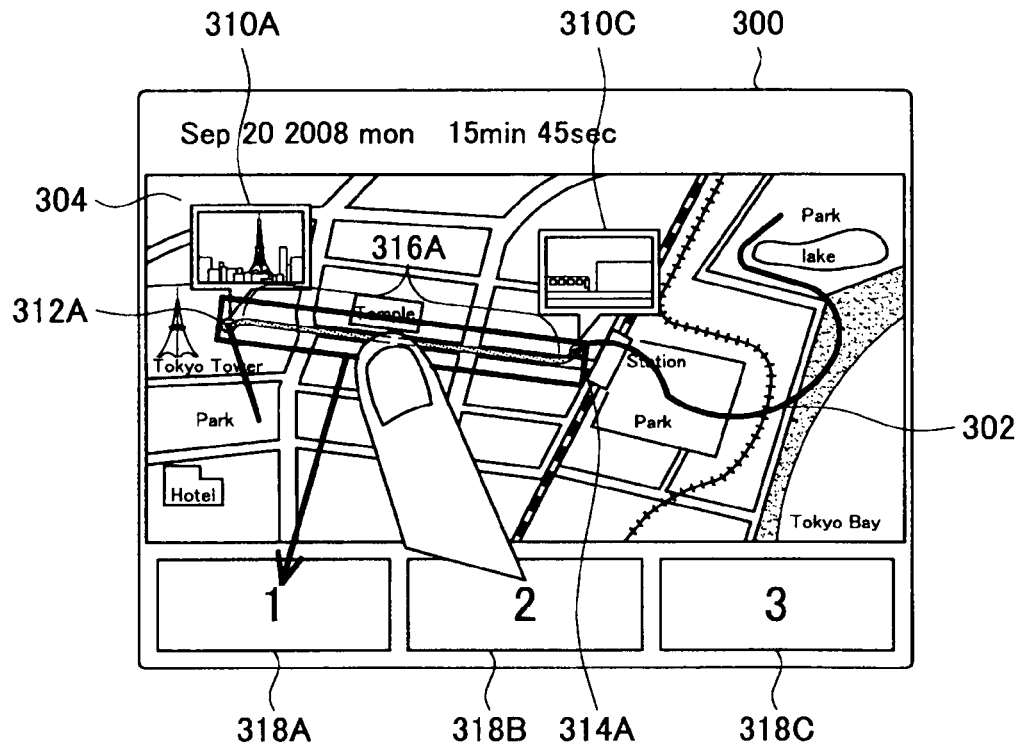
FIG. 15 is a diagram showing a user operation when thumbnail images are generated using the map screen according to the embodiment.
Figure 16:
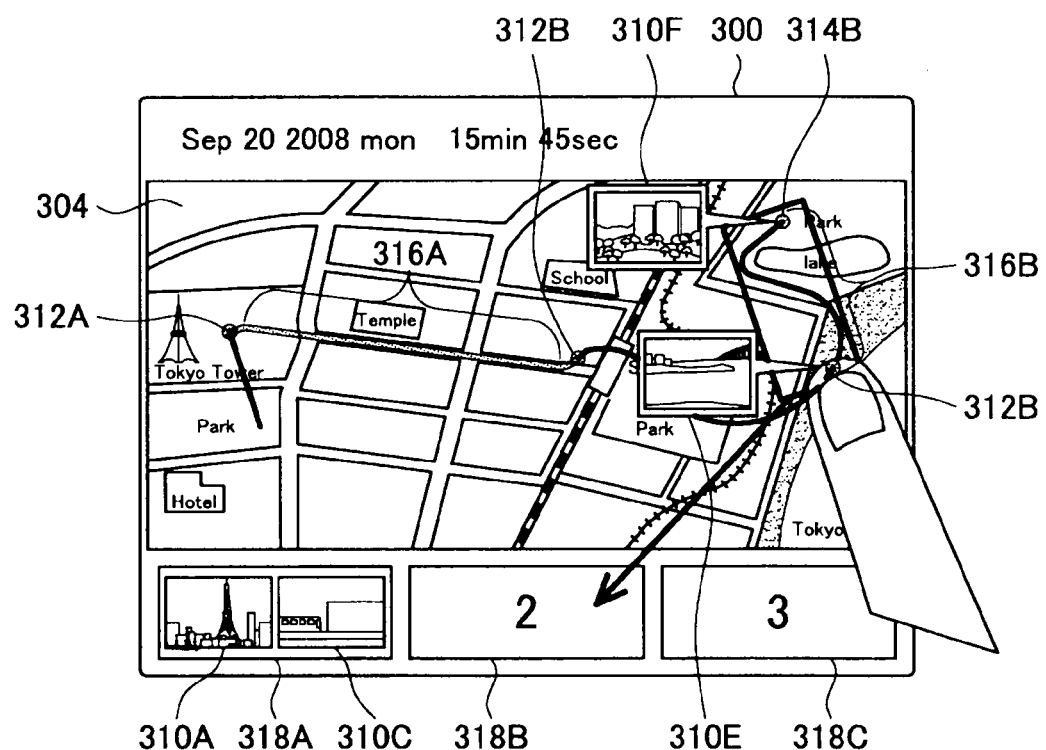
FIG. 16 is a diagram showing a user operation when thumbnail images are generated using the map screen according to the embodiment.

Next, with reference to FIG. 15 and FIG. 16, an example will be explained in which a playlist is created using the map screen 300. FIG. 15 and FIG. 16 are diagrams each showing a user operation when the thumbnail images 310 are generated using the map screen 300. FIG. 15 shows an operation to drag and drop a section 316A defined by a start point 312A and an end point 314A to a first playlist area 318A. FIG. 16 shows an operation to drag and drop a section 316B defined by a start point 312B and an end point 314B to a second playlist area 318B.

When the playlist is created using the map screen 300, first, the user taps the playlist icon 320B (refer to FIG. 6 etc.) on the map screen 300. In response to this, the touch panel 40 detects that the playlist icon 320B has been specified by the user, and the display control portion 238 displays a plurality of playlist areas 318 including the playlist areas 318A and 318B and a playlist area 318C as shown in FIG. 15. The playlist areas 318 are used to determine the playback order of the moving images included in the playlist.

Next, as shown in FIG. 15, the user specifies the section 316A, which is a first section that the user wants to add to the playlist, by specifying the start point 312A and the end point 314A on the trajectory line 302. The start point 312A and the end point 314A are specified in a similar manner to the method explained with reference to FIG. 12 and FIG. 13. After that, as shown in FIG. 15, the user drags and drops the specified section 316A of the trajectory line 302 to the first playlist area 318A, while sliding his/her finger on the map screen 300. This drag and drop operation corresponds to an operation to arrange the section of the moving images corresponding to the section 316A of the trajectory line 302, to the top of the playlist.

In response to the user operation described above, the function control portion 246 of the imaging device 10 newly creates a playlist that includes the section of the moving images corresponding to the section 316A of the trajectory line 302. As a result, as shown in FIG. 16, the thumbnail image 310A of the start point 312A and the thumbnail image 310C of the end point 314A in the section 316A of the trajectory line 302 are displayed within the first playlist area 318A on the map screen 300. Further, in order to indicate that the section 316A of the trajectory line 302 has already been selected, the section 316A on the map screen 300 is gray-out displayed.

Further, as shown in FIG. 16, the user specifies the section 316B, which is a second section that the user wants to add to the playlist, by specifying the start point 312B and the end point 314B on the trajectory line 302. Further, the user drags and drops the specified section 316B of the trajectory line 302 to the second playlist area 318B, while sliding his/her finger on the map screen 300. This drag and drop operation corresponds to an operation to arrange the section of the moving images corresponding to the section 316B of the trajectory line 302 to be second from the top of the playlist.

In response to the user operation described above, the function control portion 246 adds the moving images corresponding to the above-described section 316B of the trajectory line 302 to the above-described playlist. As a result, although not shown in the figures, a thumbnail image 310E of the start point 312B and a thumbnail image 310F of the end point 314B of the section 316B of the trajectory line 302 are displayed within the second playlist area 318B on the map screen 300, and the section 316B is gray-out displayed.

By repeating the above-described operations, the user can sequentially cut out the chosen sections 316 from the trajectory line 302 on the map screen 300, and can add the sections of the moving images corresponding to the cut out sections 316 to the playlist. At this time, the thumbnail images 310 of the sections added to the playlist are respectively displayed in the plurality of playlist areas 318, so that the user can ascertain the content of the playlist at a glance.

The imaging device 10 records information relating to the playlist created in the manner described above onto the recording medium 2 or the like. When the user inputs an instruction to play back the playlist, the imaging device 10 sequentially plays back the moving images of the plurality of sections included in the playlist, and displays them on the display panel 20.

Note that, in the operation example shown in FIG. 15, the specified section 316 is dragged and dropped to the playlist area 318. However, the present invention is not limited to this example, and the playlist may be created by dragging and dropping the specified section 316 to the playlist icon 320B. It is also acceptable that the section 316 arbitrarily selected on a single line of the trajectory line 302 is repeatedly cut out and added to the playlist. Further, it is also acceptable that a plurality of the trajectory lines 302 of moving images are displayed on the map screen 300, and that the sections 316 arbitrarily selected on these trajectory lines 302 are specified to create the playlist.

The image operation function of the map screen 300 is explained above with reference to FIG. 15 and FIG. 16. With the image operation functions of the map screen 300 according to the present embodiment, the user can, on the map screen 300, operate or edit part or all of the moving images, using not only time axis information of the moving images but also spatial information such as the image pickup positions of the moving images. In addition, the operations and editing of the moving images can be achieved by the simple user operation of specifying the section 316 of the trajectory line 302 and the function icon 320 using the touch panel 40.

Particularly, if the map screen 300 is automatically displayed immediately after the end of the recording of the moving images by the imaging device 10, the user can edit the moving images while the user's memory associated with time and space is still fresh immediately after the recording. This is convenient for the user.

More specifically, in known art, when sorting or editing moving images recorded by an imaging device at a later stage, it is necessary to play back the moving images and verify the content, which is an extremely complicated and inefficient operation. For example, when the user captures moving images while the user is moving between locations that he/she is visiting for the first time, or when the user captures images of scenery seen from a car (train) window, there are cases in which the user captures images for a long time to prevent any omission in capturing images while accepting that unwanted images are also recorded. For that reason, many unwanted scenes are also included in the recorded moving images. In such a case, if a plurality of thumbnail images are simply extracted from the moving images and displayed using film roll display as in the known art, it is complicated to look for which section of the moving images is to be deleted when performing editing at a later time.

In contrast, with the map screen 300, editing operations, such as deletion of unwanted sections of the moving images, playlist creation and the like, can be performed using the image pickup position information while the user's memory is still fresh immediately after recording. Thus, these editing operations can be performed simply and effectively, which is extremely convenient. Furthermore, if a rating is attributed to some sections of the moving images on the map screen 300 displayed immediately after recording, this is also convenient when playing back and viewing or editing the moving images at a later time.

8. Display Process Flow Of Map Screen

Figure 17:
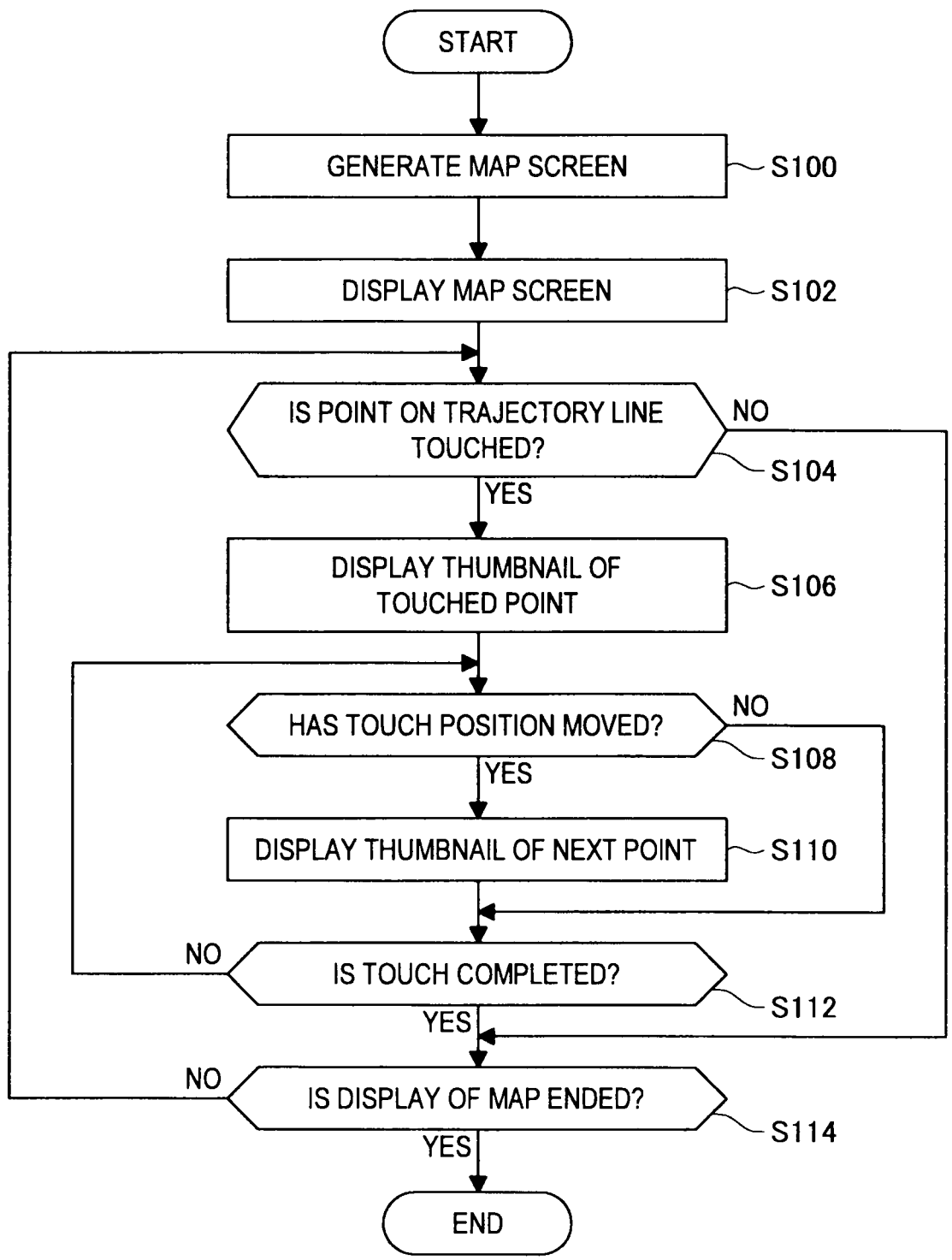
FIG. 17 is a flow chart showing a display process of the map screen performed by the imaging device according to the embodiment.

Next, a display process of the map screen 300 performed by the imaging device 10 according to the present embodiment will be explained with reference to FIG. 17. FIG. 17 is a flow chart showing the display process of the map screen 300 performed by the imaging device 10 according to the present embodiment.

As shown in FIG. 17, first, based on the image pickup position information that is associated with moving images, the imaging device 10 generates the map screen 300 that shows a trajectory of the image pickup positions of the moving images (step S100). More specifically, first, the imaging device 10 reads out the image pickup position information from the image pickup position table 242 held in the memory 240 shown in FIG. 4. Then, the imaging device 10 determines a range of the map 304 to be displayed on the map screen 300 so that all the image pickup positions included in the image pickup position information can be covered. Further, the imaging device 10 draws the map 304 with the aforementioned range using map information obtained from the map database 237. After that, the imaging device 10 plots the image pickup positions indicated by the image pickup position information onto the map 304, and joins the plotted image pickup positions in chronological order, thereby drawing the trajectory line 302 on the map 304.

Then, the imaging device 10 displays the map screen 300 generated at step S100 on the display panel 20 (step S102). By doing this, the map screen 300 shown in FIG. 6, for example, is displayed. Therefore, the user can ascertain an image pickup environment such as changes in the image pickup positions when the moving images are picked up.

During display of the map screen 300, the touch panel 40 of the imaging device 10 detects whether or not the user touches the point 308 arbitrarily selected on the trajectory line 302 on the map screen 300 and thereby specifies the point 308 (step S104). When the point 308 on the trajectory line 302 is touched, the touch panel 40 detects the point 308 that is specified by the touch. Then, based on the image pickup position information, the imaging device 10 obtains an image pickup position corresponding to the detected pint 308, and extracts the frame of the moving image picked up at that image pickup position. The imaging device 10 displays the extracted frame as the thumbnail image 310 on the map screen 300 (step S106).

As a result, as shown in FIG. 8, for example, the thumbnail image 310A of the point 308A specified by the user is displayed on a portion (on the map screen 300) above the point 308A. As a result, the user can ascertain the content of the moving image of the point 308A specified by the user. The thumbnail image 310A is displayed until the touch position has moved at step S108 or the touch is completed at step S112.

Further, when the user traces the trajectory line 302 with a finger, the imaging device 10 sequentially detects the plurality of points 308 on the traced trajectory line 302, and sequentially displays on the map screen 300 the thumbnail images 310 of the respective points 308 at a predetermined interval on the trajectory line 302 (steps S108 to S112).

More specifically, first, the touch panel 40 detects whether the touch position of the trajectory line 302 by the user has moved from the original point 308A by a predetermined distance (step S108). When the touch position has moved, the imaging device 10 removes the thumbnail image 310A corresponding to the original point 308A, and displays on the map screen 300 the thumbnail image 310B corresponding to the point 308B as a new point after the movement (step S110). When the trajectory line 302 is traced by the user in this manner, until the user removes the finger from the map screen 300 and the touch is thereby completed (step S112), a detection process of the touch position (step S108) and a display process of the thumbnail images 310 (step S110) are repeated.

As a result, as shown in FIG. 9, for example, the thumbnail images 310A, 310B and 310C respectively corresponding to the points 308A, 308B and 308C on the traced trajectory line 302 are sequentially displayed at the predetermined interval on the map screen 300. Therefore, by tracing the trajectory line 302 on the map screen 300, the user can ascertain the changes in the content of the moving images along the trajectory line 302, together with the image pickup positions.

After that, when the user performs an operation to stop the display of the map screen 300, the imaging device 10 removes the map screen 300 displayed on the display panel 20 (step S114).

9. Editing Process Flow On Map Screen

Figure 18:
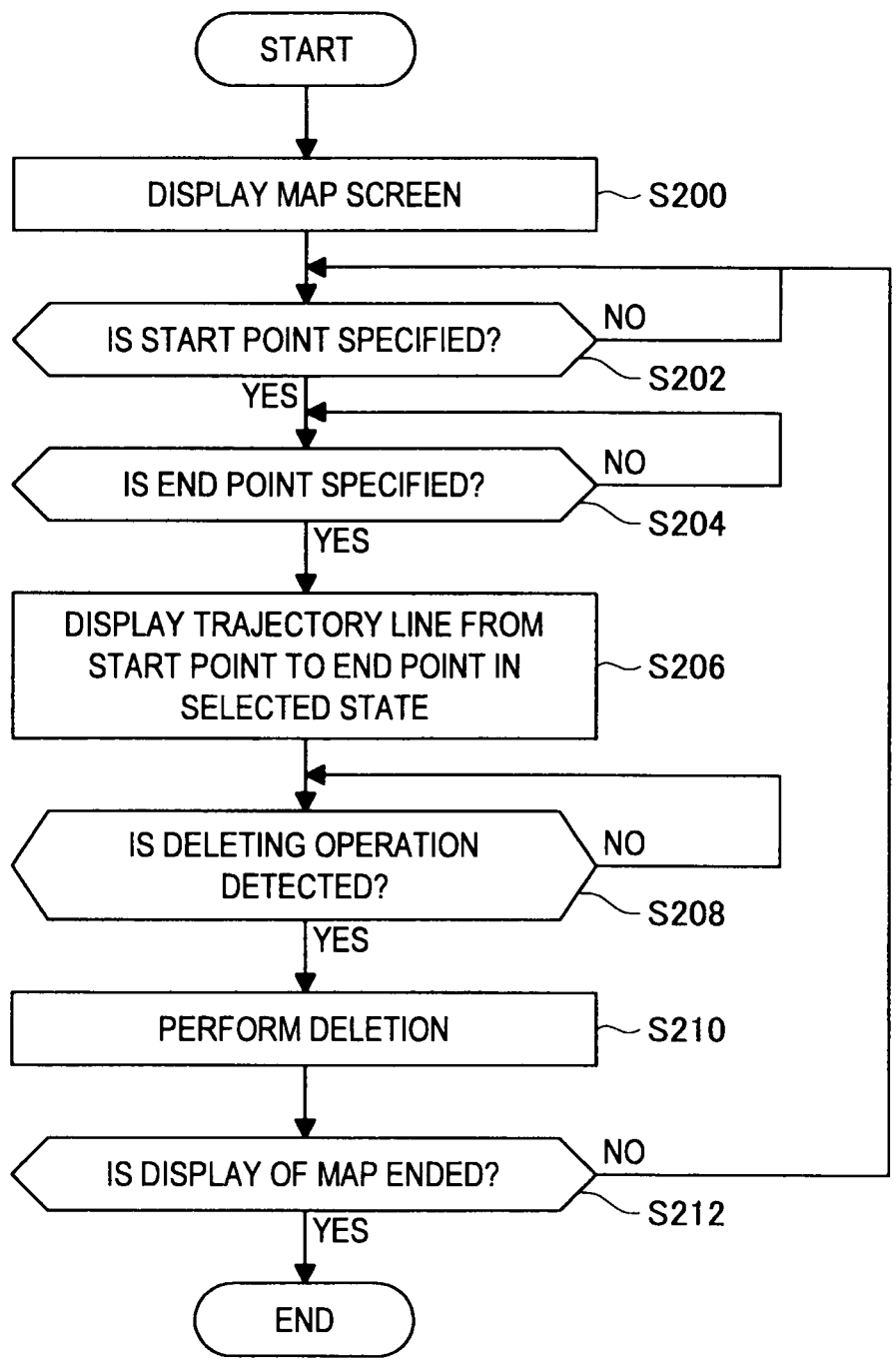
FIG. 18 is a flow chart showing a moving image editing process that is performed, using the map screen, by the imaging device according to the embodiment.

Next, an editing process when moving images are edited using the map screen 300 according to the present embodiment will be explained with reference to FIG. 18. FIG. 18 is a flow chart showing a moving image editing process that is performed, using the map screen 300, by the imaging device 10 according to the present embodiment. Note that FIG. 18 shows a process flow when a deletion function is performed by the user specifying the delete icon 320D on the map screen 300.

As shown in FIG. 18, first, the imaging device 10 displays the map screen 300 in the manner explained with reference to FIG. 17 (step S200). Next, when the user specifies the start point 312 and the end point 314 by performing a predetermined operation on a selected point on the trajectory line 302 on the map screen 300 (refer to FIG. 12 and FIG. 13), the touch panel 40 detects the start point 312 and the end point 314 specified by the user (steps S202 and S204). When the start point 312 and the end point 314 are specified, the imaging device 10 displays the section 316 of the trajectory line 302 from the start point 312 to the end point 314 in a selected state as shown in FIG. 13 (step S206). Thus, the user can verify the section 316 of the trajectory line 302 specified on the map screen 300.

Then, the imaging device 10 detects whether or not the function icon 320 (the delete icon 320D, for example) on the map screen 300 is operated by the user (step S208). For example, as shown in FIG. 14, if the user drags and drops the specified section 316 of the trajectory line 302 to the delete icon 320D, the touch panel 40 detects the drag and drop operation (deleting operation) (step S208). Then, based on the image pickup position information, the imaging device 10 obtains a section of the moving images corresponding to the specified section 316 of the trajectory line 302, and deletes the section of the moving images (step S210). When the section 316 that is part of the trajectory line 302 is selected and thereafter the delete icon 320D is operated in this manner, only the section of the moving images corresponding to the selected section 316 of the trajectory line 302 is deleted.

Then, if the user performs the operation to stop the display of the map screen 300, the imaging device 10 removes the map screen 300 displayed on the display panel 20 (step S212).

The editing process flow using the map screen 300 is explained above with reference to FIG. 18. Note that, although the process flow when the deletion function is performed is explained with reference to FIG. 18, predetermined functions other than the deletion function, such as a playback function, a rating function and a playlist creation function, can be performed in a similar manner.

10. Conclusion

The imaging device 10 according to the present embodiment, and the display method of the map screen 300 using the imaging device 10 are explained above. The map screen 300 according to the present embodiment includes a map 304 onto which the trajectory line 302 of the image pickup positions of moving images is mapped. As a result, it is possible to check where on the map 304 the image pickup positions of the moving images are located, and the content of the moving images can be spatially ascertained.

Further, when the user specifies the point 308 arbitrarily selected on the trajectory line 302 on the map screen 300, the thumbnail image 310 of the point 308 is displayed. Thus, the trajectory of the image pickup positions when the moving images are picked up and the content (the thumbnail images 310) of the moving images picked up at the respective image pickup positions can be presented to the user such that the trajectory and the content are associated with each other.

Particularly, when the user traces the trajectory line 302, the thumbnail images 310 of the respective points 308 on the trajectory line 302 are sequentially displayed. Accordingly, it is possible to present the content of the moving images to the user, as well as an image pickup environment when the moving images are picked up. Owing to this, the user can easily and adequately ascertain the content of the moving images in a spatially understandable way, and can easily determine the content of the moving images or whether or not the content of the moving images requires editing.

Further, the interval between the points 308 on the trajectory line 302 at which the plurality of thumbnail images 310 are sequentially displayed when the user traces the trajectory line 302 may be changed depending on the scale of the map 304 of the map screen 300 (refer to FIG. 9 to FIG. 11). By doing this, when the map 304 is scaled up and displayed, many of the thumbnail images 310 are displayed at a narrower interval. Therefore, the user can verify the content of the moving images along the trajectory line 302 in more detail. On the other hand, when the map 304 is scaled down and displayed, the thumbnail images 310 are displayed at a wider interval. Therefore, the user can schematically verify the whole content of all the moving images.

Furthermore, the index marks 306 that indicate the image pickup positions to which the index is added during image pickup may be displayed on the trajectory line 302 on the map screen 300 (refer to FIG. 7). By doing this, the user can spatially ascertain the image pickup position of an exciting scene etc.

Moreover, with the map screen 300, the moving images can be edited spatially by specifying a section of the trajectory line 302 on the map 304. Therefore, the user can edit the moving images intuitively and effectively, not only relying on his/her memory associated with time, but also using his/her spatial memory. Particularly, an editing operation in which unnecessary sections of the recorded moving images are deleted, for example, can be realized by an easy operation on the touch panel 40. Therefore, efficiency of the editing operation can be improved significantly.

The map screen 300 described above may be automatically displayed on the display panel 20 of the imaging device 10 immediately after recording the moving images. By doing this, immediately after recording the moving images, it is possible to present the user with the trajectory of the image pickup positions of the recorded moving images and the thumbnail images 310 at the respective image pickup positions. Therefore, while the user's memory is still fresh immediately after recording the moving images, the user can verify the trajectory of the image pickup positions of the recorded moving images and can spatially ascertain the content of the moving images. In addition, it is preferable to perform an editing operation, such as deletion of unnecessary sections of the moving images, playlist creation or the like, while the user's memory is still fresh immediately after the recording. If such an editing operation of the moving images is performed immediately after the recording, the user can spatially ascertain the content of the moving images using the map screen 300. As a result, the editing operation of the moving images can be performed more effectively, and this is convenient for the user.

Further, the map screen 300 may be displayed on the display panel 20 at a timing specified by the user after recording the moving images. For example, when the moving images are edited using an imaging device or another type of device after a certain period of time has elapsed from the end of the recording, in the known art, normally, the moving images are played back from the beginning and the moving images are operated and edited on the time axis. In contrast, with the map screen 300 according to the present embodiment, the user can spatially ascertain a pickup situation of the moving images. At the same time, by specifying the section 316 on the map 304, the user can easily and effectively edit the moving images using his/her spatial memory of the time of performing the image pickup.

Further, with the map screen 300, the trajectory line 302 of a plurality of moving images relating to a same event (a trip, for example) may be displayed on the map 304 using an at-a-glance display. By doing this, the user can check, on the map 304, the trajectory of the image pickup positions of a plurality of moving images relating to the same event that have been recorded, and can also check how many of the moving images have been recorded up to the present time. In this way, the image pickup position of each of the moving images and the movement trajectory can be impressed on the user, thus refreshing the user's memory and inhibiting the user from forgetting to perform image capture at the user's intended location.

The exemplary embodiment of the present invention is described above in detail with reference to the appended drawings. However, the present invention is not limited to the examples described above. It should be understood by those skilled in the art that various modifications, combinations, sub-combinations and alterations may occur depending on design requirements and other factors insofar as they are within the scope of the appended claims or the equivalents thereof.

The present application contains subject matter related to that disclosed in Japanese Priority Patent Application JP 2009-148779 filed in the Japan Patent Office on Jun. 23, 2009, the entire content of which is hereby incorporated by reference.

What is claimed is:

1. An image processing device comprising:
    map screen generation processing circuitry that, based on image pickup position information indicating a plurality of image pickup positions of moving images picked up by a moving imaging device, generates a map screen including a map on which a trajectory line indicating a movement trajectory of the image pickup positions is drawn;
    index information generation processing circuitry that generates, in response to an input instruction, index information of a moving image of the moving images as the moving image is picked up by the moving imaging device, the index information including a time point during image pickup at which the input instruction is received;
    display control processing circuitry that causes a display to display the map screen, and an index mark corresponding to the index information at a corresponding position on the trajectory line;
    position detecting processing circuitry that detects a position on a display screen of the display which a user specifies using an operating body,
    wherein the position detecting processing circuitry detects a point on the trajectory line specified by the operating body,
    wherein, based on the image pickup position information, the display control processing circuitry causes a thumbnail image of a moving image of the moving images picked up at an image pickup position corresponding to the detected point to be displayed on the map screen,
    wherein, when the trajectory line displayed on the display screen is traced by the operating body, the position detecting processing circuitry sequentially detects a plurality of points on the trajectory line traced by the operating body, and
    wherein, based on the image pickup position information, the display control processing circuitry causes a plurality of thumbnail images picked up at a plurality of image pickup positions that respectively correspond to the detected plurality of points to be sequentially displayed on the map screen, and
    function control processing circuitry that generates a playlist corresponding to a section of the trajectory line based on a selected start point and end point on the trajectory line, the playlist including thumbnail images associated with positions between the start point and the end point, the thumbnail images included in the playlist being a subset of a total set of thumbnail images associated with the entire trajectory line.

2. The image processing device according to claim 1, wherein the display control processing circuitry changes, in accordance with a scale of the map, an interval between the points at which the thumbnail images are displayed when the trajectory line is traced.

3. The image processing device according to claim 2, wherein, when the position detecting processing circuitry detects a predetermined operation performed on the map screen by the operating body, the display control processing circuitry changes the scale of the map in accordance with the predetermined operation.

4. The image processing device according to claim 1, wherein the map screen further includes at least one function icon representing a predetermined function that can be performed on the moving image,
    wherein the function control processing circuitry performs the predetermined function on the moving image,
    wherein the position detecting processing circuitry detects a section of the trajectory line specified by a predetermined operation performed on the map screen by the operating body, and the function icon specified by the operating body, and
    wherein, based on the image pickup position information, the function control processing circuitry performs the predetermined function corresponding to the specified function icon, on a section of the moving images corresponding to the specified section of the trajectory line.

5. The image processing device according to claim 4, wherein the predetermined function includes at least one of
    a function that deletes at least some section of the moving images,
    a function that attributes an evaluation value to at least some section of the moving images, and
    a function that plays back at least some section of the moving images.

6. The image processing device according to claim 1, wherein the position detecting processing circuitry detects a position in which the operating body touches or approaches the display screen of the display.

7. The image processing device according to claim 1, wherein the image pickup position information is not associated with all frames of the moving images.

8. The image processing device according to claim 1, wherein the display control processing circuitry causes the display to display the map screen automatically and directly after the moving images are picked up by the moving imaging device.

9. The image processing device according to claim 1, wherein the display control processing circuitry causes the plurality of thumbnail images picked up at the plurality of image pickup positions that respectively correspond to the detected plurality of points to be sequentially and individually displayed on the map screen one at a time as the trajectory line is traced by the operating body.

10. The image processing device according to claim 1, wherein the function control processing circuitry indicates that the section of the trajectory line associated with the playlist has already been selected by modifying the section to be grayed-out.

11. The image processing device according to claim 1, wherein the display control processing circuitry causes the thumbnail images of the playlist to be displayed in an area that is separate from the area where the trajectory line is displayed.

12. An image processing method comprising the steps of:
generating, based on image pickup position information indicating a plurality of image pickup positions of moving images picked up by a moving imaging device, a map screen including a map on which a trajectory line indicating a movement trajectory of the image pickup positions is drawn;
generating, in response to an input instruction, index information of a moving image of the moving images as the moving image is picked up by the moving imaging device, the index information including a time point during image pickup at which the input instruction is received;
displaying the map screen on a display and displaying an index mark corresponding to the index information at a corresponding position on the trajectory line;
detecting a point on the trajectory line specified by an operating body, the detecting being performed by position detecting processing circuitry that detects a position on a display screen of the display which a user specifies using the operating body;
displaying on the map screen a thumbnail image of a moving image of the moving images picked up at an image pickup position corresponding to the detected point, based on the image pickup position information;
sequentially detecting, when the trajectory line displayed on the display screen is traced by the operating body, a plurality of points on the trajectory line traced by the operating body;
sequentially displaying on the map screen, based on the image pickup position information, a plurality of thumbnail images picked up at a plurality of image pickup positions that respectively correspond to the detected plurality of points; and
generating a playlist corresponding to a section of the trajectory line based on a selected start point and end point on the trajectory line, the playlist including thumbnail images associated with positions between the start point and the end point, the thumbnail images included in the playlist being a subset of a total set of thumbnail images associated with the entire trajectory line.

13. A non-transitory computer-readable storage medium including computer executable instructions, wherein the instructions, when executed by a computer, cause the computer to perform a method, the method comprising the steps of:
generating, based on image pickup position information indicating a plurality of image pickup positions of moving images picked up by a moving imaging device, a map screen including a map on which a trajectory line indicating a movement trajectory of the image pickup positions is drawn;
generating, in response to an input instruction, index information of a moving image of the moving images as the moving image is picked up by the moving imaging device, the index information including a time point during image pickup at which the input instruction is received;
displaying the map screen on a display and displaying an index mark corresponding to the index information at a corresponding position on the trajectory line;
detecting a point on the trajectory line specified by an operating body, the detecting being performed by position detecting processing circuitry that detects a position on a display screen of the display which a user specifies using the operating body;
displaying on the map screen a thumbnail image of a moving image of the moving images picked up at an image pickup position corresponding to the detected point, based on the image pickup position information;
sequentially detecting, when the trajectory line displayed on the display screen is traced by the operating body, a plurality of points on the trajectory line traced by the operating body;
sequentially displaying on the map screen, based on the image pickup position information, a plurality of thumbnail images picked up at a plurality of image pickup positions that respectively correspond to the detected plurality of points. and
generating a playlist corresponding to a section of the trajectory line based on a selected start point and end point on the trajectory line, the playlist including thumbnail images associated with positions between the start point and the end point, the thumbnail images included in the playlist being a subset of a total set of thumbnail images associated with the entire trajectory line.

* * * * *